US006999598B2

(12) United States Patent
Foote et al.

(10) Patent No.: US 6,999,598 B2

(45) Date of Patent: Feb. 14, 2006

(54) SYSTEMS AND METHODS FOR EMBEDDING DATA BY DIMENSIONAL COMPRESSION AND EXPANSION

(75) Inventors: Jonathan T. Foote, Menlo Park, CA (US); John E. Adcock, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 768 days.

(21) Appl. No.: 10/104,017

(22) Filed: Mar. 25, 2002

(65) Prior Publication Data

US 2002/0172395 A1 Nov. 21, 2002

Related U.S. Application Data

(60) Provisional application No. 60/277,942, filed on Mar. 23, 2001.

(51) Int. Cl.
*G06K 9/00* (2006.01)

(52) U.S. Cl. ........................................ 382/100; 713/176

(58) Field of Classification Search ..................... None
See application file for complete search history.

(56) References Cited

U.S. PATENT DOCUMENTS 4,384,273 A 5/1983 Ackland et al.
5,768,535 A * 6/1998 Chaddha et al. ............ 709/247
6,490,355 B1 * 12/2002 Epstein ....................... 380/203
6,674,876 B1 * 1/2004 Hannigan et al. ........... 382/100

OTHER PUBLICATIONS

J. Kruskal et al., "An anthology of Algorithms and Concepts for Sequence Comparison", *Time Warps, String Edits, and Macromolecules*, D. Sankoff et al., eds., CSLI Publ., ©1983, 1999, pp. 265-310.

J. Foote et al., "The Beat Spectrum: A New Approach to Rhythm Analysis", *Proc. IEEE International Conference on Multimedia and Expo* (ICME) 2001.

* cited by examiner

*Primary Examiner*—Jingge Wu
*Assistant Examiner*—Ashutosh Upreti
(74) *Attorney, Agent, or Firm*—Oliff & Berridge, PLC

(57) ABSTRACT

The systems and methods of this invention watermark an original data file using dimensional compression and expansion. The original data file extends along a given dimension and has portions that extend along that given dimension. The information is embedded into the data file by selectively dimensionally compressing or expanding a size of each of some or all of the portions along the given dimension, which can be space or time. The portions of the data file are selectively dimensionally expanded or compressed according to a given encoding scheme. This encoding scheme can use the kind of modification, the relationships between the type of modification between adjacent portions, or the duration or degree of compression or expansion to store a portion of the embedded information. The portions of the embedded information can be individual bits of binary or trinary information, or can be a portion of analog information.

56 Claims, 13 Drawing Sheets

SYSTEMS AND METHODS FOR EMBEDDING DATA BY DIMENSIONAL COMPRESSION AND EXPANSION

This non-provisional application claims benefit of U.S. Provisional Application No. 60/277,942 filed Mar. 23, 2001.

BACKGROUND OF THE INVENTION

1. Field of Invention

This invention generally relates to systems and methods for hiding information in audio and image files.

2. Description of Related Art

With the advent of digitizing images, digital image distribution and digital video availability, "hiding" information in digital images for purposes such as digital rights management and copyright protection has become a substantial issue for image publishers and authors. The process of imbedding information in a digital image is known as "watermarking". Such watermarks must be secure, robust to intentional corruption and to data compression processing, not unreasonably complex to embed and extract, and compatible and interoperable with conventional image processing systems. The watermark is generally invisible to a viewer. However, in some applications, it is desirable to produce a visible watermark that can be removed by an authorized image decoder and that can not be removed by an unauthorized decoder.

Although watermarks are used in most cases with respect to digital images, watermarking techniques can also be applied to audio files. Like conventional image watermarking techniques, conventional audio watermarking techniques can be classified into data-domain methods and frequency-domain methods. Data-domain methods work by modifying the actual audio data, such as modulating the least significant bit of a PCM representation or hiding data in compressed-domain representations. Frequency-domain methods work by modifying the spectral content of a signal, for example, by removing a particular frequency component, or by adding information disguised in low-amplitude noise.

Data-domain watermarking techniques include compressed domain watermarking, bit dithering, amplitude modulation and echo hiding. In compressed-domain watermarking, only the compressed representation of the data is watermarked, and is thus not persistent. When the data is uncompressed, the watermark is not available. In least-significant-bit (LSB) modulation information is encoded by modulating the least significant bits of the time-domain or data-compressed representation. While this potentially has a large data rate, it is not robust to data compression or analog transmission and reproduction, and introduces noise into the signal.

In amplitude modulation, signal peaks are modified to fall within predetermined amplitude bands. This technique introduces modulation distortion, and is not robust to amplitude compression, which is widely used in analog and digital telephony, broadcasting, sound reinforcement, and noise reduction. In echo hiding, discrete copies of the original signal are mixed in with the original signal. The echo time is short enough and the copy amplitude is low enough to be inaudible, yet the echo can be detected via autocorrelation. This method introduces spectral distortion because of phase cancellation at frequencies whose periods are multiples of the echo delay. Also, this technique may not be robust under data compression, as imperceptible echoes are likely to be discarded by perceptual coding.

Frequency-domain watermarking techniques include phase coding, frequency band modification, and spread spectrum techniques. Phase coding relies on the human auditory system's relative insensitivity to phase. The signal is windowed, as in a spectrogram, and the magnitude and phase of each window is computed. An artificial absolute phase signal, which encodes the watermark, is introduced into the first window. The phase information for subsequent frames is iteratively computed from the phase differences from each frame and the absolute phase. The resulting phases are combined with the original magnitudes to construct the watermarked signal. This method introduces phase dispersion into the signal, and is probably not robust under data compression.

In frequency band modification, information is encoded by removing or enhancing particular spectral bands, removing a narrow spectral band using a notch filter, or encoded into frequency band differences. This method introduces spectral distortion, may not be robust to perceptual encoding, and does not work unless the altered frequency components are well-represented in the source audio.

In spread spectrum techniques, a signal carrying the watermark information is modulated into wideband noise by multiplication with a pseudorandom sequence. Because the modulation function is known, or can be regenerated, the watermark signal can be demodulated. This technique adds noise to the watermarked signal, and the low amplitude of the spread spectrum signal means it may be likely to be discarded under perceptual coding. In addition, the sampling frequency is commonly used as the modulation carrier frequency to avoid having to synchronize the receiver. In this case, re-sampling or analog transmission is likely to destroy the synchronization, and hence the watermark.

Many schemes, particularly modulation and frequency domain approaches, are not robust to audio data compression. This is especially problematic, as the frequency modifications must be perceptually inaudible in the watermarked audio data. Otherwise, the watermark is not good. However, such conventional frequency modulations are precisely the information that is lost or altered when perceptual data compression schemes such as MP3 are used.

There has also been considerable work in watermarking images. Most approaches are quite similar to those described above. For example, spread spectrum techniques can be used for images as well as audio. One relevant conventional approach for watermarking text modulates white space between words and sentences. This method needs to detect word boundaries, and is not applicable to common images other than scanned text. The Glyph technology developed at Xerox PARC encodes information into digital hardcopy using tiny marks that can be modulated to encode information in addition to gray shades. U.S. Pat. No. 5,946,103 to Curry discloses a method that uses glyphs to digitally watermark a printed document. However, glyph technology typically generates images with noticeable structures. This makes this method suitable only for specific applications. The "Patchwork" watermarking system alters the intensity of random pairs of points in the image. A method called texture block coding encodes information by copying areas of random texture. These areas can be found by autocorrelation.

SUMMARY OF THE INVENTION

As outlined above, conventional information embedding, or watermarking, techniques are either not robust in view of modern data compression and transmission methods, are limited in their use to specific types of data, and/or are unable to embed information sufficiently densely and/or robustly while remaining imperceptable.

This invention provides systems and methods that hide information in a data file.

This invention provides systems and methods that embed information in a data file by selectively dimensionally expanding and dimensionally compressing portions of the data file.

This invention further provides systems and methods that selectively dimensionally expand and dimensionally compress the portions of the data file along a selected dimension of the data.

This invention additionally provides systems and methods that embed information in time-varying data by selectively time-expanding and time-compressing portions of the time-varying data along a time dimension of the data This invention additionally provides systems and methods that embed information in spatially-varying data by selectively spatially-expanding and spatially-compressing portions of the spatially-varying data along at least one spatial dimension.

This invention separately provides systems and methods for comparing the modified data file containing embedded information with an original copy of the data file to extract the embedded data.

This invention separately provides systems and methods that indicate the location and duration of dimensional compression and dimensional expansion of the dimensionally compressed and dimensionally expanded portions of the modified data file containing the embedded information.

This invention separately provides systems and methods that allow the embedded information to be extracted from the modified data file containing the embedded information without reference to an original copy of the data file.

This invention additionally provides systems and methods for modifying a data file to have a tempo corresponding to a predetermined function prior to modifying the modified data file to embed the information by selectively dimensionally compressing and dimensionally expanding portions of the modified data file.

This invention further provides systems and methods for extracting embedded information from a data file containing embedded information by determining differences between a predicted tempo and an actual tempo in the data file.

In various exemplary embodiments according to this invention, information is embedded into an original data file. The original data file extends along a given dimension and can be divided, or is naturally separated, into portions that extend along that given dimension. The information is embedded into the data file by selectively dimensionally compressing or dimensionally expanding a size of each of some or all of the portions along the given dimension. In various exemplary embodiments, the given dimension is space or time.

In various exemplary embodiments, the portions of the data file are selectively dimensionally expanded or dimensionally compressed according to a given encoding scheme. This encoding scheme can use the kind of modification, either dimensional compression or dimensional expansion, to store a portion of the embedded information. Alternatively, this encoding scheme can use the relationships between the type of modification, either dimensional compression or dimensional expansion, between adjacent portions to store a portion of the embedded information. In various other exemplary embodiments, the duration or degree of dimensional compression or dimensional expansion is used to store a portion of the embedded information. The portions of the embedded information can be individual bits of binary information or trinary or other multi-valued discrete information, or can be a portion of analog information.

In various exemplary embodiments, the embedded information is extracted from the modified data file by comparing the modified data file, either directly or indirectly, with a copy of the original, unmodified data file. Based on the direct or indirect comparison, a map representing the pattern of dimensionally compressed and dimensionally expanded portions can be determined. Based on the determined map and the particular encoding scheme used, the pattern of dimensionally compressed and dimensionally expanded portions can be converted back into the embedded analog or digital information.

In various exemplary embodiments, before the information is embedded, the data file is first modified so that a tempo of the portions of the data file along the given dimension corresponds to a given function. The portions of the modified data file are then further modified, by selectively dimensionally compressing or dimensionally expanding some of the portions, to embed the information. The embedded information can then be extracted by analyzing the modified data file to predict the expected tempo based on the given function. The difference between the expected tempo and the actual tempo for a particular portion defines the type and degree of modification of that portion used to embed the information. Thus, that difference defines the pattern of dimensionally compressed and dimensionally expanded portions, which can then be converted back into the embedded analog or digital information based on the encoding scheme.

In various exemplary embodiments of the systems and methods according to this invention, for most audio files, the embedded data or watermark would be virtually undetectable, because of the human sensory system's insensitivity to extremely low frequency modulations. At the same time, the embedded data carrying modulations are exceptionally robust to transmission and data compression.

These and other features and advantages of this invention are described in or apparent from the following detailed description of the apparatus/systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

The various exemplary embodiments of the systems and methods according to this invention employ a watermarking technique that selectively dimensionally compress or dimensionally expand, by an imperceivable amount, portions of a data file extending along a given dimension to embed data into that data file. In various exemplary embodiments, the underlying time-base of an audio signal or a spatial offset of an image is dimensionally compressed or dimensionally expanded by an imperceivable amount.

The systems and methods according to this invention are directed to embedded and extracting watermarks and other digital data from watermarked audio files and/or watermarked images using "time-based, or, analogously, "spatially-based", embedding and extracting techniques. It should be appreciated that, as discussed herein, these time-based techniques and these spatially-based techniques according to this invention are alternative ways of expressing the same central conception, i.e., that data, such as watermark, can be digitally encoded into audio files and into images by manipulating the "time" or "spatial" relationship between elements of the audio files and/or the images. Accordingly, as will become clearer below, these time-based techniques and the spatially-based techniques according to this invention are merely different aspects of the same general conception.

Figure 1:
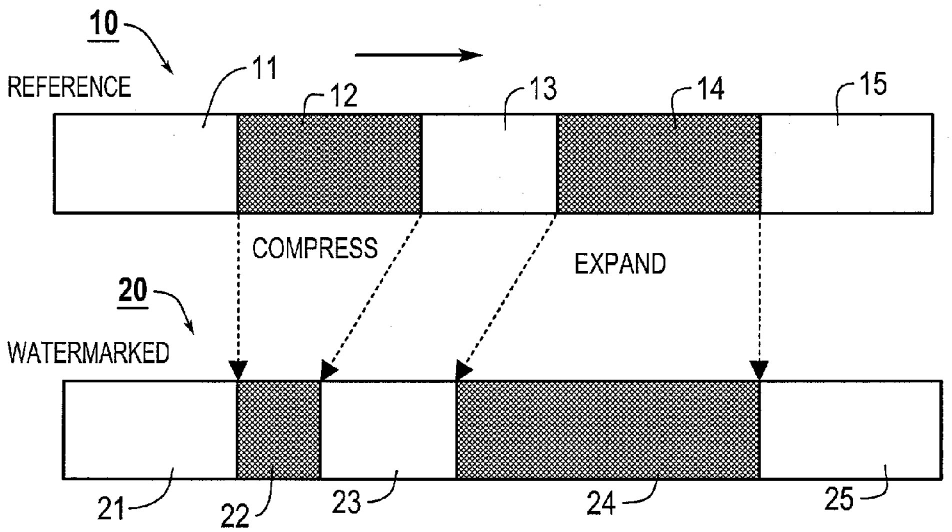
FIG. 1 illustrates how portions of an audio file can be time-expanded and time-compressed to embed a watermark into the audio file according to this invention.

FIG. 1 illustrates this basic conception of this invention. As shown in FIG. 1, a reference set of data 10 having a extent along a first dimension x includes different portions 11–15. According to this invention, some of these portions, for example, the portions 12 and 13 shown in FIG. 1, are relatively dimensionally compressed or dimensionally expanded to create a second data set 20. The second data set 20 also includes a plurality of portions 21–25. Each of the portions 21–25 has a one-to-one correspondence to the portions 11–15 of the first data set 10, respectively.

As shown in FIG. 1, the extent of the portion 22 along the dimension x has been dimensionally compressed relative to the extent of the corresponding portion 12 of the data set 10. In contrast, the extent of the portion 24 along the dimension x has been dimensionally expanded relative to the extent of the corresponding portion 14 of the first data set 10. Finally, the extents of the remaining portions 21, 23 and 25 along the dimension x remain unchanged relative to the extents of the corresponding portions 11, 13 and 15, respectively. Accordingly, if the data set 10 defines a reference data set, the data set 20 defines a watermarked data set that contains some embedded information. The information is embedded according to the relative relationship between the original extents along the dimension x of the portions 11–15 relative to the extents along the dimension x of the corresponding portions 21–25.

While recorded audio information exist in a timeless state, that recorded audio data defines a time-varying electrical signal representing time-varying pressure waves in a fluid medium. As a result, the information stored in audio data file is best represented by displaying the audio data along a time dimension. Accordingly, for audio data, the dimension x shown in FIG. 1 can correspond to a time dimension. Thus, to embed data into the audio data file in the manner shown in FIG. 1, portions of the original audio data file are time-compressed or time-expanded to create the watermarked audio file. Of course, it should be appreciated that audio data can be represented along other dimensions. Where appropriate, the systems and methods according to the invention are equally usable with such dimensions and representations.

In contrast, still image data has no time dimension, in the same way that audio data has no spatial dimension. Rather, still image data defines a spatially-varying set of information. Similarly, video data has both time and spatial dimensions. Accordingly, for still image data, the dimension x shown in FIG. 1 defines one of the 1, 2 or 3 spatial dimensions in which the image data can extend. For video data, the dimension x can be one of two or more spatial dimensions or the time dimension. Thus, for still or video image data, portions of the original data set, corresponding to the data set 10, can be spatially-compressed and spatially-expanded to create the watermarked data set corresponding to the data set 20 shown in FIG. 1.

Of course, it should be appreciated that the dimension x can be any dimension in which an information-carrying-signal will vary to convey a first level information, such that portions of that information that extend in that dimension can be selectively dimensionally compressed and dimensionally expanded to contain a second level of information.

Figure 2:
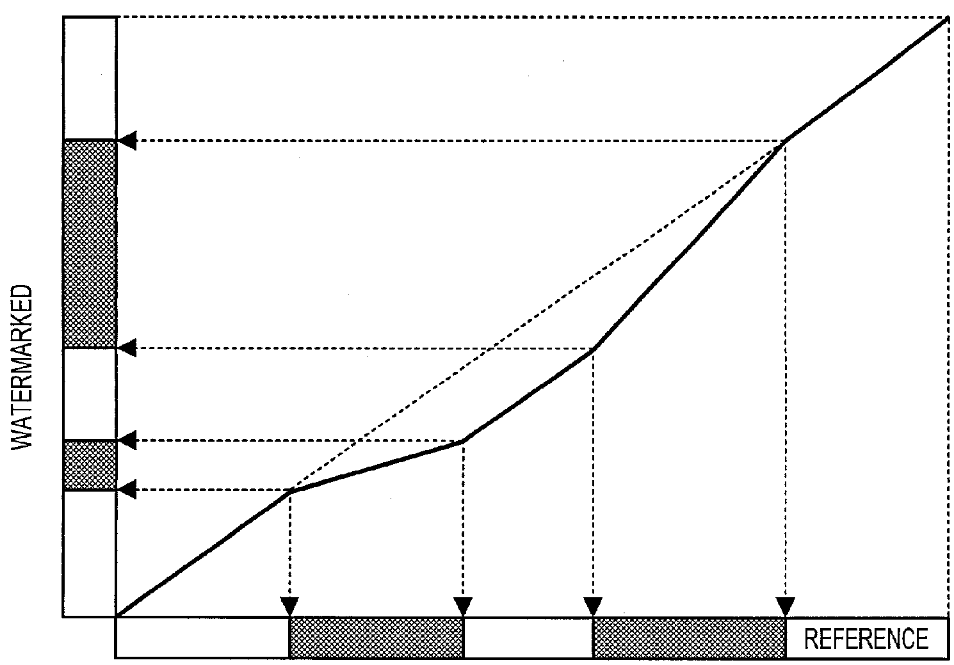
FIG. 2 shows an exemplary tempo map according to an embodiment of this invention.

As outlined above, FIG. 1 illustrates how a data set extending in an arbitrary dimension x, such as the data set 10, can be modified to embed additional information by selectively dimensionally expanding and dimensionally compressing portions of the data set 10 to create the watermarked data set 20. However, without some way to readily extract that embedded information, the technique illustrated in FIG. 1 is essentially useless. Accordingly, FIG. 2 illustrate one exemplary embodiment of a technique for extracting the embedded information from the watermarked data set. In particular, FIG. 2 illustrates how to extract the embedded data by comparing the watermarked data set 20 to the reference, or original, data set 10. In particular, the plot shown in FIG. 2 is defined as a "tempo map". The tempo map shown in FIG. 2 illustrates the relative positioning of each portion of the reference data set 10 relative to the corresponding positions of the watermarked data set 20 along the dimension x.

As shown in FIG. 2, for the reference portions 11, 13 and 15 and the corresponding portions 21, 23 and 25 of the watermarked data set, the position along the dimension x of each element of these portions has the same relative change in position. Thus, the slope of the line plotting the relative positions of these portions along the dimension x is "1". This is true even for the corresponding portions 13 and 23. Thus, even though the portions 13 and 23 are offset relative to each other, as shown in FIG. 1, they have the same relative change in position along the dimension x from the beginning edge of the portions 13 and 23 to the ending edge of the portions 13 and 23. However, because the absolute positions of the portions 13 and 23 are offset relative to each other along the dimension x, the portions of the tempo map for these portions 13 and 23, while having a slope of 1, is offset from a line having a slope of 1 and passing through the origin.

As a result, when the reference data set 10 is plotted along the X-axis, and the watermarked data set 20 is plotted along the Y-axis, for portions of the watermarked data set 20 which are dimensionally compressed relative to the reference data set 10, such as the portion 22, the corresponding portions of the tempo map have a slope less than 1. The particular slope of any such portion of the tempo map will depend upon the degree of dimensional compression. Likewise, for portions of the watermarked data set 20 that are dimensionally expanded relative to the watermark data set, such as the portion 24, the corresponding portions of the tempo map have a slope greater than 1. Again, the exact slope for any such corresponding portion of the tempo map will depend upon the degree of dimensional expansion.

Of course, it should be appreciated that binary, and even analog, information can be extracted from the watermark data set based on the shape of the tempo map and any known encoding scheme. For example, a simple coding scheme can define any portion having a slope less than 1 as a "0", while defining any portion having a slope greater than 1 as a "1". Alternatively, another scheme could define any portion having a slope less than 1 as a "−1", any portion having a slope greater than 1 as a "+1", and any portion having a slope equal to 1 as a "0". In contrast, yet another scheme could define a changing slope from 1 to either less than 1 or greater than 1 as a "0" or a "1", respectively, while ignoring changes in slope from other than 1 to 1.

It should additionally be appreciated that binary data can be encoded not only in the change in slope, but also in the duration of the modified portion. Furthermore, it should be appreciated that analog data could be embedded based on the degree of dimensional compression or dimensional expansion. As a result, the slope could represent an analog value, rather than a binary, trinary or other multi-valued discrete value. It should be appreciated that many different patterns of dimensional compression and dimensional expansion are available to encode information. Thus, the start and end locations of the altered regions, as well as the degree of dimensional compression and dimensional expansion, can be use to embed information into the watermarked data set relative to the reference data set.

It should be appreciated that, in various exemplary embodiments, for a particular watermarked data set, the total amount of dimensional compression and the total amount of dimensional expansion in the watermarked data file is the same, so that the size of watermarked data set is the same size as the size of the reference data set. While this is not strictly necessary, this is advantageous in that it makes it more difficult to discern that a particular data set has been watermarked and that different copies of the same data set may have different watermarks, and makes it more difficult to identified the particular watermark carried by any particular watermarked data set.

The inventors have experimentally determine that satisfactory results can be obtain with dimensional compression/expansion ratios on the order of 1 to 2%. It should be appreciated that the dimensional compression/expansion ratios can be increase beyond this level. However, increasing the dimensional compression/expansion ratio could possibly introduce detectable artifacts into the watermarked data set. That is, one advantage of using relatively low dimensional compression/expansion ratios is that the resulting compression and/or expansion of various one of the portions of the watermark data set cannot be perceive by the human sensory system.

In various exemplary embodiments, an encoding rate on the order of 8 bps (bits per second) is feasible in modifying audio data files. In general, the encoding rate is limited only by how objectionable the modification along the particular dimension x becomes. For many application, such as speech, dimensional compression/expansion ratios up to 5 to 10% may be useable, leading to a corresponding increase in the encoding rate.

In various exemplary embodiments, the tempo map shown in FIG. 2 is created by locating the instantaneous best alignment between the reference data set 10 and the watermarked data set 20. In various exemplary embodiments, this instantaneous best alignment is located using dynamic programming. In particular, in various exemplary embodiments, a distance between one portion of the reference data set and one portion of the watermark data set is defined using any number of different metrics depending on the particular types of signals and particular dimension on which the data set extends. This distance is used in a conventional dynamic programming technique to find the best alignment between the watermarked data set 20 and the reference data set 10. This best fit serves as an estimate of the x-dimension-base modification of the reference data set used to obtain the watermarked data set.

In general, as outlined above, any deviations from linear distances are due to dimensional expansion and/or compression of that portion of the watermarked data set 20. The deviations can be detected and used in creating the tempo map shown in FIG. 2. In general, when the difference from the linear map is plotted as shown in FIG. 2, dimensionally compressed regions would show up as having slopes between 0 and 1, while expanded regions will show up as areas having slopes greater than 1. As outlined above, regions of "normal" tempo will have a slope of 1, but maybe offset from the line having a slope of 1 and extending through the origin. This offset arises due to the cumulative offset along the x dimension of the previous dimensionally compressed regions and/or the previous dimensionally expanded regions. It should also be appreciated that, in FIG. 2, the dimensional compression and dimensional expansion ratios are shown much greater than would normally be used in practice. However, a realistic dimensional compression factor, being so close to unity, would be difficult to see at this scale.

In various exemplary embodiments, when audio data is used, spectrograms of the reference audio data set and the watermark audio data set are produced. In various exemplary embodiment, the spectrograms are produced using conventional techniques. It should be appreciated that spectrograms are used, rather than straight waveform comparisons, because the spectral content of audio data is, to a first order approximation, invariant under data compression and analog transmission. In contrast, the time-domain waveforms of the audio data may differ markedly after data compression and/or analog transformation. In various experiments performed by the inventors, the Euclidean distance of the mid-frequency components was used as the metric to measure the difference between spectrogram windows used to analyze the audio data.

It should be appreciated that, for the watermarking, or, more generally, the data-embedding, technique described above to work, the data values of the data to be watermarked must vary to a distinct or significant degree along the dimension x. Otherwise, it becomes impossible to generate the tempo map shown in FIG. 2 by identifying those portions of the watermark data that have been compressed or expanded relative to the reference data. For example, for audio data, the audio data must have significant spectral change for the tempo map shown in FIG. 2 to be generatable. Thus, audio without significant spectral change, such as silence or a test tone, cannot be used as a reference data set.

In particular, because this type of audio data does not have significant spectral change, the dimensionally compression and dimensionally expansion of various portions of the audio data will not significantly alter the data. As a result, the location where the watermarked data has been dimensionally compressed or dimensionally expanded relative to the reference data cannot be identified. However, it should be appreciated that this is not a major requirement for most data sets over most domains, as any data set of interest will generally have significant variability along the dimension x of interest. For example, most audio data of interest, such as music, speech, soundtrack audio and the like, will have sufficient spectral change so that the alignment between the reference data and the watermarked data can be identified.

It should be appreciated that the data set can be analyze to determine if there is sufficient variability in a particular portion of the data set to determine if the data modification would be detectable. For example, a simple measure of the frame-to-frame spectral differences in an audio data set would give a estimate of the watermark detectability for that audio data set. Based on the analysis, regions of low spectral difference in an audio data set can be ignored in the watermarking process. Similarly, regions of low variability in an arbitrary data set along the dimension x of interest can be ignore in the same way. Because the dynamic programming watermark recovery or extraction is based on linear matching, these regions will not disrupt the process of extracting the watermark data.

FIGS. 1 and 2 were discussed above relative to an unspecified data set an unspecified dimension x of interest. As indicated above, it should be appreciated that the techniques outlined above with respect to FIGS. 1 and 2 can be used with any type of data that has sufficient variability along a given dimension x. The following discussion, however, focuses on two significant types of data, audio data and image data, having different dimensions of interest, namely, time and space, respectively, that the systems and methods according to this invention are particularly useful for.

In particular, with respect to audio data, the systems and methods of this invention have several significant advantages over previous approaches. One significant advantage is that, for most audio data, the alterations to the audio data, created when dimensionally compressing and dimensionally expanding the audio data along the time dimension, are generally virtually undetectable. This is primarily to due to the insensitivity of the human auditory system to extremely low frequency modulations.

At the same time, the time compressions and expansions used to embed the watermark data, or other data, into the audio data are extremely robust to transmission and data compression. This occurs because current digital audio technology has a time precision on the order of several micro-second per hour. Most audio data, such as speech or music, produced by a human has sufficient natural variation that the artificial tempo changes introduced by the data embedding or watermarking systems and methods according to this invention are generally not easily detectable.

Moreover, unintended tempo changes, such as those inherent in analog recording and reproduction equipment, generally will not interfere with the embedded data. For example, a straight tempo change, caused, for example, by an inaccurate playback speed, generally will not effect the embedded data. Furthermore, analog recording imperfections, such as wow and flutter, occur on a time scale that is significantly shorter than the tempo changes used to embed the embedded data according to this invention. Accordingly, these analog recording imperfections will generally average out, leaving the embedded data unaffected.

It should be appreciated, however, that it may be possible for a listener to discern the artificial tempo changes induced by these data embedding systems and methods for strictly rhythmic music produced by a computer sequencer or other mechanical device. In this case, fine analysis of the beat-to-beat spacing might reveal the tempo modifications. However, such tempo modifications will generally still remain imperceptible to the average listener.

It should be also be appreciated that the embedded data may be partially obscured or degraded by intentionally changing the time scale of the audio regions. The watermark may also be possibly obscured or degraded by superimposing another tempo-base watermark over a previously embedded tempo-base watermark. However, this would not remove the previous watermark, unless, of course, the second tempo-base watermark happens to be the exact inverse of the first tempo-based watermark. That, of course, requires access to the original unmodified audio data set.

When the data embedded into the audio data is a digital signature, this such an alteration would invalidate both the watermark and the digital signature. Thus, this alteration will be easily detectable. It should be appreciated that few, if any, other watermarking schemes are robust under the application of multiple watermarks.

It should be appreciated that this same time-based expansion and time-based compression watermarking, or more generally, data-embedding, technique can also be used with other types of time-varying data, such as analog and digital video data. For video data, like audio data, the data would be embedded into the video signal by selectively time-compressing and time-expanding portions of the video data.

Similarly, these techniques can be applied to still, i.e., time-invariant, image data. In this case, rather than using time-based compression and expansion, in such still images, the data is embedded by using spatially-based compression and expansion. That is, areas of the image are selectively spatially-compressed and spatially-expanded by an amount that is generally imperceptible to the human visual system. For example, well-known digital resampling techniques can stretch or compress selected portions of an image by small amounts. Alternatively, mechanical or optical techniques can be used to selectively expand or compress selected regions of the image. Such mechanical or optical techniques include varying the speed of a drum or platen scanner, varying the paper or print head speed in a printer, or varying the speed of a cylindrical object lens in a photocopier with respect to a drum.

It should further be appreciated that, unlike time-varying data, spatially-varying data often varies in two, or even three, dimensions. As such, it is possible to selectively compress and expand the image data along two or three axes.

As indicated above, the systems and methods according to this invention are particularly useful for embedding data into audio data. Time scale modification (TSM) techniques for scaling of the pitch of an audio signal are well known and in common use. These techniques can be used equally well to change the length of an audio recording without introducing objectionable pitch modifications that would otherwise be introduced by simply changing the rate. Pitch scaling is often applied when playing back an audio recording at a higher rate. This is often done to audition an audio recording in less time. It should be appreciated that simple interpolation or resealing should not be used with this systems and methods of this if the dimensional compression and expansion is to be imperceivable. That is, for even small ratios, such simple interpolation causes obvious pitch changes.

A common TSM time-scaling technique is based on the short-time Fourier transform. However, other methods, such as the phase vocorder method, the time domain harmonic scaling method, and the pitch-synchronous overlap add (PSOLA) method, are also widely used. It should be appreciated that any known or later-developed time-scaling method, including those outlined above, can be used to compress and expand portions of an audio data set to embed data in, or watermark, that audio data set. It should be appreciated that, in general, the most useful methods are those that can compress or expand by ratios that are very close to 1 while also introducing few audible artifacts.

Figure 3:
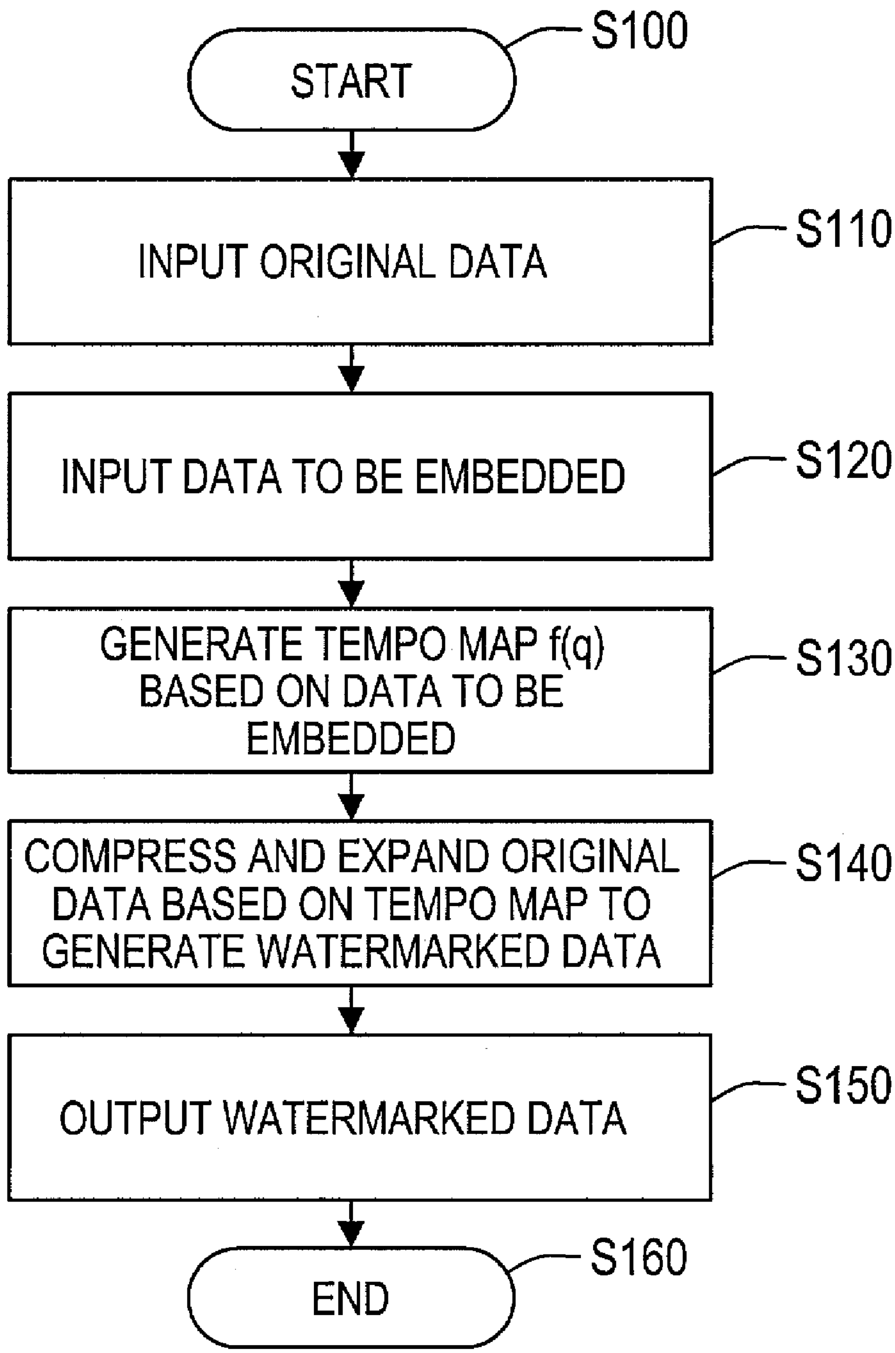
FIG. 3 is a flowchart outlining a first exemplary embodiment of a method for embedding a watermark into an image or into an audio file.

FIG. 3 is a flowchart outlining one exemplary embodiment of a method for embedding watermark data into a set of original data according to this invention. As shown in FIG. 3, operation of the method begins in step S100, and continues to step S110, where an original data set is input. Next, in step S120, a set of data to be embedded into the original data, i.e., the watermark data, is input. Next, in step S130, a tempo map f(q) is generated based on the data to be embedded. Operation then continues to step S140.

In step S140, portions of the original data input in step S110 are selectively dimensionally compressed and dimensionally expanded based on the tempo map f(q) to generate watermarked data in which the data to be embedded input in step S120 has been embedded. Next, in step S150, the watermarked data is output. Then, in step S160, operation of the method ends.

It should be appreciated that, in step S150, the watermarked data can be output in a variety of ways. For example, if the watermarked data is audio data, the watermarked data can be stored onto a digital audio tape or a standard analog cassette tape. Alternatively, the audio file can be digitized, if it is not already in digital form, and stored on a compact disk, a CD-ROM, a DVD, or any other volatile or nonvolatile digital memory device. Additionally, the watermarked data file can be data compressed using any known or later developed data compression technique appropriate for audio data files and stored on one of the previously discussed memory devices. It should also be appreciated that, whether data compressed or not, the watermarked audio data can be transmitted to a remotely located computer or storage device for storage and/or playback over any known or later playback device or distributed network, such as the Internet, a local area network, a wide area network, a storage area network, an intranet, an extranet, a public switched telephone network and/or a cable television network.

Figure 4:
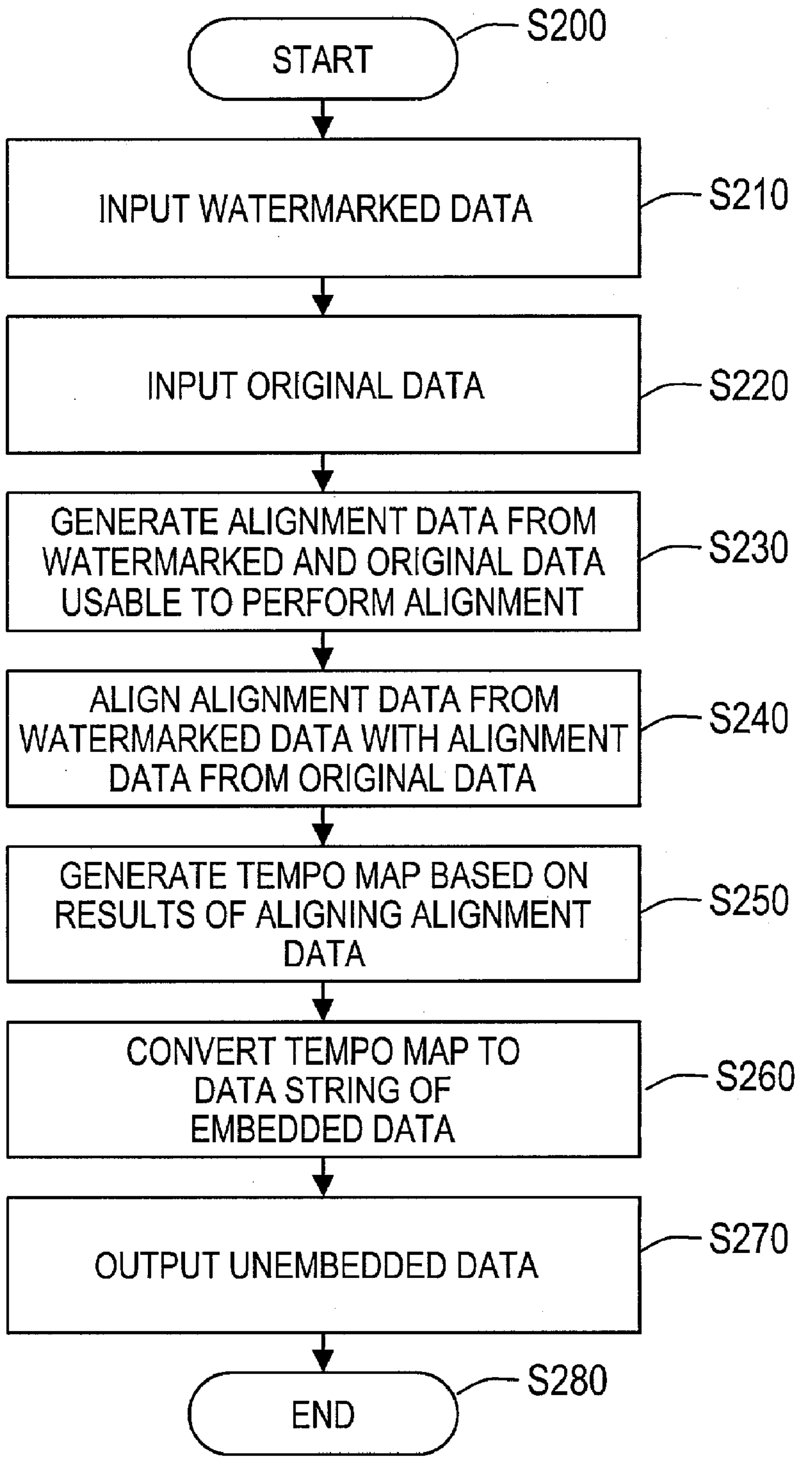
FIG. 4 is a flowchart outlining a first exemplary embodiment of a method for extracting an embedded watermark from a watermarked image or a watermarked audio file.

FIG. 4 is a flowchart outlining one exemplary embodiment of a method for extracting embedded data from a watermarked data file according to this invention. As shown in FIG. 4, operation of the method begins in step S200, and continues to step S210, where the watermarked data file is input. Then, in step S220, the original data file corresponding to the watermarked data file is input. Next, in step S230, alignment data is generated from the watermarked data file and the original data file that is usable to determine an alignment between the watermarked data file and the original data file. Operation then continues to step S240.

In step S240, the alignment data from the watermarked data file is aligned with the alignment data from the original data file. Next, in step S250, based on the determined alignments between the alignment data for the watermarked data and the alignment data for the original data, a tempo map is generated. Then, in step S260, the tempo map is converted or decoded to obtain the embedded data that was embedded in the watermarked data. Operation then continues to step S270.

In step S270, the embedded data is output to one or more data sinks. Then, in step S280, operation of the method ends.

It should be appreciated that step S230 may not be needed, depending on the particular type of data in which the embedded data has been embedded. For example, image data that has been spatially compressed and/or spatially expanded can be aligned directly in step S240 to generate the tempo map in step S250. Thus, in this case, step S230 would be omitted and step S240 would align the watermarked data directly with the original data rather than aligning the alignment data generated from each of the watermarked data and the original data.

In contrast, as outlined above for audio data, step S230 would be performed to generate the spectrogram data as the alignment data. Then, in step S240, the spectrogram data would be aligned to generate the tempo map in step S250.

It should also be appreciated that, in step S270, the embedded data extracted from the watermarked data can be output by displaying or printing it. The embedded data can also be output by storing the extracted data or transmitting the extracted data over a distributed network, such as those as discussed above with respect to FIG. 3, to transmit the extracted data to a separate site for display, storage or further transmission.

Figure 5:
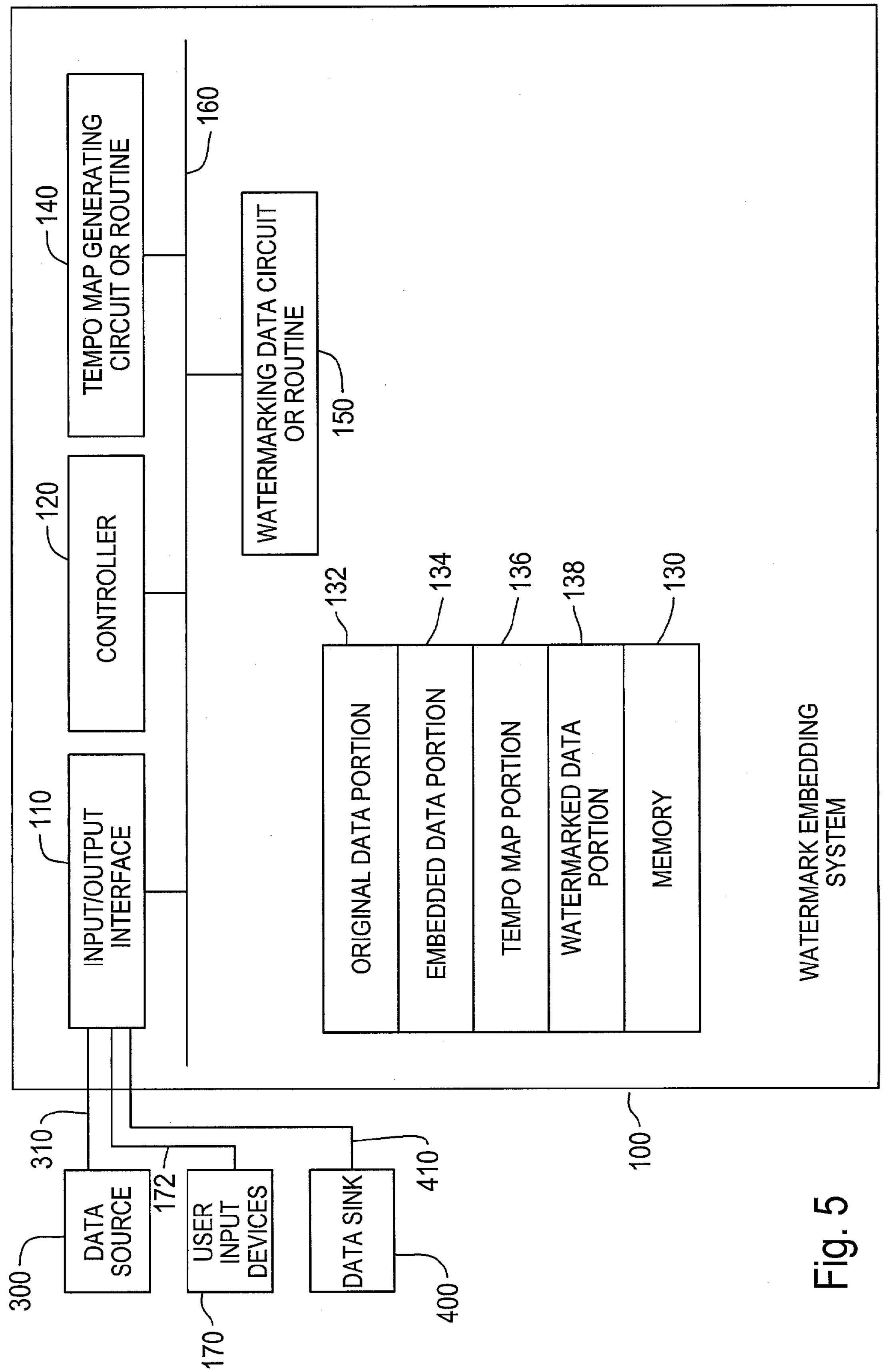
FIG. 5 is a block diagram showing a first exemplary embodiment of a watermark embedding system according to this invention.

FIG. 5 shows one exemplary embodiment of a watermark embedding system 100 according to this invention. As shown in FIG. 5, the watermark embedding system 100 includes an input/output interface 110, a controller 120, a memory 130, a tempo map generating circuit or routine 140, and a watermarked data generating circuit or routine 150, each interconnected by one or more data/control busses or application programming interfaces 160. As further shown in FIG. 5, one or more user input devices 170 are connected over one or more links 172 to the input/output interface 110. Additionally, a data source 300 is connected over a link 310 to the input output interface 110, as is a data sink 400 over a link 410.

Each of the links 172, 310 and 410 can be implemented using any known or later developed device or system for connecting the one or more user input devices 170, the data source 300 and the data sink 400, respectively, to the watermark embedding system 100, including a direct cable connection, a connection over a wide area network, a local area network or a storage area network, a connection over an intranet, a connection over the Internet, or a connection over any other distributed processing network or system. In general, each of the links 172, 310 and 410 can be any known or later developed connection system or structure usable to connect the one or more user input devices 170, the data source 300 and the data sink 400, respectively, to the watermark embedding system 100.

The input/output interface 110 inputs data from the data source 300 and/or the one or more user input devices 170 and outputs data to the data sink 400. The input output interface 110 also outputs data to one or more of the controller 120, the memory 130 and/or the tempo map generating circuit or routine 140 and receives data from one or more of the controller 120, the memory 130 and/or the watermarked data generating circuit or routine 150.

The memory 130 includes one or more of an original data portion 132, an embedded data portion 134, a tempo map portion 136, and a watermarked data portion 138. The original data portion 132 stores the original data into which the embedded data stored in the embedded data portion 134 will be embedded to form the watermarked data. The embedded data portion 134 stores the embedded data to be embedded into the original data. The tempo map portion 136 stores the tempo map generated by the tempo map generating circuit or routine 140. The watermarked data portion 138 stores the watermarked data generated by the watermarked data generating circuit or routine 150. The memory can also store one or more control routines used by the controller 120 to operate the watermark embedding system 100.

The memory 130 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

It should be understood that each of the circuits or routines shown in FIG. 5 can be implemented as portions of a suitably programmed general purpose computer. Alternatively, each of the circuits or routines shown in FIG. 5 can be implemented as physically distinct hardware circuits within an ASIC, or using a FPGA, a PDL, a PLA or a PAL, a digital signal processor, or using discrete logic elements or discrete circuit elements. The particular form each of the circuits or routines shown in FIG. 5 will take is a design choice and will be obvious and predicable to those skilled in the art.

In operation, the data source 300 outputs one or both of a set of original data and/or a set of embedded data over the link 310 to the input output interface 110. Similarly, the user input device 170 can be used to input one or more of the set of original data and/or the embedded data, if desired, over the link 172 to the input output interface 110. Depending on which data is input, the input output interface 110 will store the received set of original data in the original data portion 132 and/or the embedded data in the embedded data portion 134. However, it should be appreciated that either or both of these sets of data could have been previously input into the watermark embedding system 110 at some earlier time.

Then, the tempo map generating circuit or routine 140, under control of the controller 120, inputs the embedded data from the embedded data portion 134 and generates a tempo map that can be used to dimensionally compress and/or dimensionally expand portions of the original data to embed the embedded data into the original data. It should be appreciated that the tempo map generating circuit or routine 140 can use any known or later-developed encoding scheme, including, but not limited to, those disclosed in this application, to convert the data to be embedded into a tempo map that is usable to modify the original data into the watermarked data. The tempo map generating circuit or routine 140 then outputs the generated tempo map, under control of the controller 120, either to the tempo map portion 136 of the memory 130 or directly to the watermarked data generating circuit or routine 150.

The watermarked data generating circuit or routine 150, under control of the controller 120, inputs the tempo map, from either the tempo map portion 136 or directly from the tempo map generating circuit or routine 140. The watermarked data generating circuit or routine 150, under control of the controller 120, also inputs the original data stored in the original data portion 132. The watermarked data generating circuit or routine 150 then modifies the original data, by selectively dimensionally compressing and/or dimensionally expanding the original data along a defined dimension based on the tempo map, to embed the embedded data into the original data to form the watermarked data. The watermarked data generating circuit or routine 150 then outputs the watermarked data and, under control of the controller 120, either stores it in the watermarked data portion 138 or provides it directly to the input/output interface 110.

After the watermarked data is generated by the watermarked data generating circuit or routine 150, the watermarked data can be stored indefinitely in the watermarked data portion 138 of the memory 130. At such time as the watermarked data is needed outside of the watermarked embedding system 100, the input/output interface 110, under control of the controller 120, either inputs the watermarked data directly from the watermarked data generating circuit or routine 150 or the watermarked data portion 138 and outputs the watermarked data over the link 410 to the data sink 400.

Figure 6:
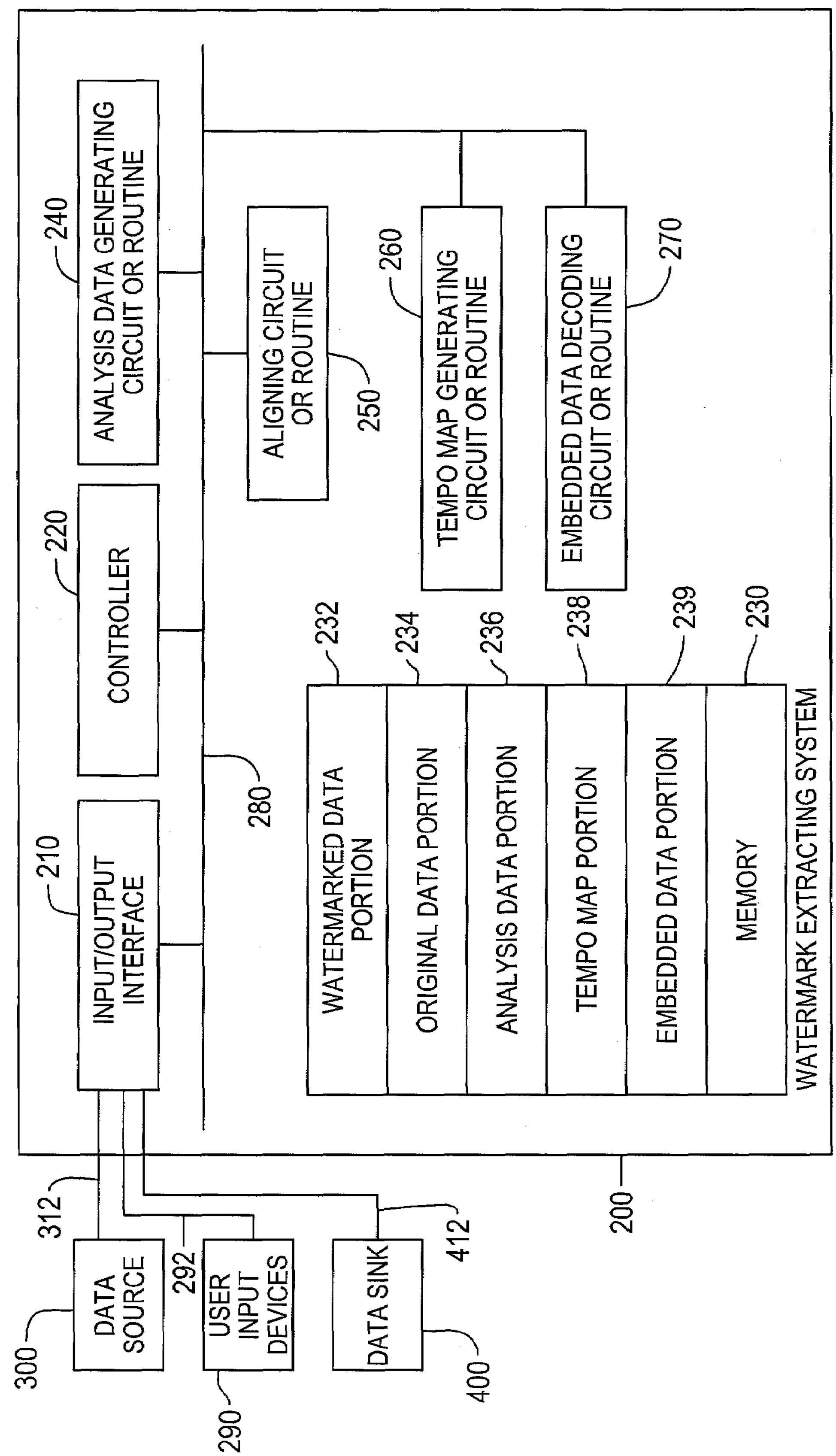
FIG. 6 is a block diagram showing a first exemplary embodiment of a watermark extracting system according to this invention.

FIG. 6 shows one exemplary embodiment of a watermark extracting system 200 according to this invention. As shown in FIG. 6, the watermark extracting system 200 includes an input/output interface 210, a controller 220, a memory 230, an analysis data generating circuit or routine 240, an aligning circuit or routine 250, a tempo map generating circuit or routine 260, and an embedded data decoding circuit or routine 270, each interconnected by one or more data/control busses or application interfaces 280.

As shown in FIG. 6, the input/output interface 210 is connected to the data source 300 over a link 312, the data sink 400 over a link 412 and one or more user input devices 290 over one or more links 292. As discussed above, each of the data source 300 and the data sink 400 can take any of the forms outlined above with respect FIG. 5.

Each of the links 192, 312 and 412 can be implemented using any known or later developed device or system for connecting the one or more user input devices 190, the data source 300 and the data sink 400, respectively, to the watermark extracting system 200, including a direct cable connection, a connection over a wide area network, a local area network or a storage area network, a connection over an intranet, a connection over the Internet, or a connection over any other distributed processing network or system, any of which could include one or more wireless portions. In general, each of the links 192, 312 and 412 can be any known or later developed connection system or structure usable to connect the one or more user input devices 190, the data source 300 and the data sink 400, respectively, to the watermark extracting system 200.

The memory 230 includes a watermarked data portion 232, an original data portion 234, an analysis data portion 236, a tempo map portion 238 and an embedded data portion 239. The memory 230 can also store one or more control programs or routines usable by the controller 220 to control the watermark extracting system 200. The watermarked data portion 232 stores watermarked data containing embedded data. The original data portion 234 stores a copy of the original data used to generate the watermarked data stored in the watermarked data portion 232. The analysis data portion 236, if needed, stores the analysis data generated by the analysis data generating circuit or routine 240. The tempo map portion 238 stores the tempo map generated by the tempo map generating circuit or routine 260. The embedded data 239 stores the embedded data decoded by the embedded data decoding circuit or routine 270 from the tempo map stored in the tempo map portion 238.

The memory 230 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

It should be understood that each of the circuits or routines shown in FIG. 6 can be implemented as portions of a suitably programmed general purpose computer. Alternatively, each of the circuits or routines shown in FIG. 6 can be implemented as physically distinct hardware circuits within an ASIC, or using a FPGA, a PDL, a PLA or a PAL, a digital signal processor or using discrete logic elements or discrete circuit elements. The particular form each of the circuits or routines shown in FIG. 6 will take is a design choice and will be obvious and predicable to those skilled in the art.

The data source 300 is usable to output the watermarked data to be stored in the watermarked data portion 232 and/or the original data to be stored in the original data portion 234 to the watermark extracting system 200. Likewise, the one or more user input devices 290 are usable to input either or both of the watermarked data and the original data to the watermark extracting system 200. The data sink 400 is usable to input the embedded data, extracted by the watermark extracting system 200, from the input/output interface 210. In operation, if the watermark extracting system 200 does not already include both the watermarked data and the original data, the watermark extracting system 200 obtains the missing data or data sets from one or both of the data source 300 and/or the one or more user input devices 290. If that data is received from the data source 300 and/or the one or more user input devices 290, that data is input through the input output interface 210 and stored in the appropriate one of the watermarked data portion 232 and the original data portion 234.

Next, under control of the controller 220, each of the watermarked data stored in the watermarked data portion 232 and the original data stored in the original data portion 234 is output to the analysis data generating circuit or routine 240. The analysis data generating circuit or routine 240 generates a set of analysis data for each of the watermarked data and the original data. The analysis data generating circuit or routine 240 then, under control of the controller 220, either stores the analysis data into the analysis data portion 236 or provides it directly to the aligning circuit or routine 250.

The aligning circuit or routine 250 inputs, under control of the controller 220, the analysis data for each of the watermarked data and the original data from either the analysis data generating circuit or routine 240 or the memory 230. The aligning circuit or routine 250 determines a best alignment between the watermarked data and the original data and outputs this alignment information to the tempo map generating circuit or routine 260 under control of the controller 220. The tempo map generating circuit or routine 260 based on the alignment information provided by the aligning circuit or routine 250, generates a tempo map that indicates which portions of the watermarked data were compressed or expanded relative to the corresponding original data. The tempo map generating circuit or routine 260, under control of the controller 220, either stores the tempo map into the tempo map portion 238 or provides it directly to the embedded data decoding circuit or routine 270.

The embedded data decoding circuit or routine 270 inputs, under control of the controller 220, the tempo map from either the tempo map portion 238 or directly from the tempo map generating circuit or routine 260. The embedded data decoding circuit or routine 270 decodes the tempo map based on the original encoding scheme used to generate the tempo map from the embedded data to obtain the embedded data from the tempo map. The embedded data encoding circuit or routine 270 then, under control of the controller 220, provides the decoded embedded data directly to the input/output interface 210 for transmission to the data sink 400 or stores it in the embedded data portion 239.

As outlined above with respect to steps S230 and S240 of FIG. 4, if, for a particular type of data, such as image data, it is not necessary to generate the analysis data, the analysis data generating circuit or routine 240 and the corresponding analysis data portion 236 of the memory 230 can each be omitted. In this case, the aligning circuit or routine 250 would operate directly on the watermarked data and the original data to generate the alignment information used by the tempo map generating circuit or routine 260 to generate the tempo map. In contrast, when the watermarked data is audio data, the analysis data generating circuit or routine 240 generates spectrograms for each of the watermarked data and the original data. Then, the aligning circuit or routine 250 aligns the spectrograms to generate the alignment information used by the tempo map generating circuit or routine 260.

As outlined above, the data is embedded in an audio data file by compressing and/or expanding certain time intervals of the audio data file by a small factor. As outlined above, this small factor is on the order of 1%. It should be appreciated that, in various exemplary embodiments, to minimize audio artifacts, the modified intervals are arranged to overlap the unmodified intervals. In this case, the overlap areas are cross-faded or otherwise interpolated to provide a smooth transition between the compressed or expanded intervals and the unmodified intervals. As outlined above, the length, location, and/or degree of compression and/or expansion of the modified intervals encodes the data into the audio data file. In particular, the method outlined above in FIG. 3 and the watermark embedding system outlined above with respect to FIG. 5 produce a watermarked audio signal $x_w(t)$ as:

$$x_w(t) = \mathop{C}_{k=1}^{K} f_{TSM}(x_k, T_k) \tag{1}$$

where:

$x_k$ is the $k^{th}$ block or portion of the original time-varying audio signal;

$T_k$, is the tempo map value for the $k^{th}$ block or portion of the original time-varying audio signal;

$f_{TSM}$ is a time-scale modification function usable to time-compress or time-expand the $k^{th}$ block or portion based on $T_k$; and C is the concatenation operation.

As outlined above, this tempo map $T_k$ encodes the watermark. The tempo map $T_k$ is recovered by comparing the watermarked audio signal $x_w(t)$ with the original, unaltered, time-varying audio signal x(t).

In practice, care may be required to avoid introducing audible discontinuities at the block boundaries. This may be achieved by using a time scale modification algorithm that leaves data at or near the block boundaries unchanged, or by overlapping segments slightly and averaging data within the over-lapping region during the construction of the watermarked signal.

As outlined above with respect to audio data, in various exemplary embodiments, the tempo map $T_k$ is recovered by finding the best time-warping function that takes the original time-varying audio signal x(t) to the watermarked audio signal $x_w(t)$. Subtracting the linear component yields the watermark information, that is, the tempo map $T_k$. It should be appreciated that, in this formulation of the tempo map $T_k$, time is plotted along the x axis, while the value of the tempo map $T_k$ for any value of time is plotted on the y axis. This is shown, for example, in FIG. 7. In this case, the tempo map $T_k$ has a positive slope in the compressed regions, a negative slope in the expanded regions, and has a slope of 0 in the unmodified regions. However, as outlined above with respect to FIG. 2, the unmodified regions may be offset from the neutral value by preceding compressions or expansions.

In contrast, as shown in FIG. 2, it is also possible to plot the tempo map such that the tempo map $T_k$ varies with slopes greater than or less than 1 and varies around the line having slope of 1 and passing through the origin.

As outlined above, to recover the tempo map $T_k$, and thus the embedded data, the watermarked audio data file is compared, either directly or indirectly, with the original time-varying audio data file x(t). In various exemplary embodiments, both the watermarked audio signal $x_w(t)$ and the original time-varying audio signal x(t) are processed using the short-time Fourier transform. However, it should be appreciated that other parameterizations could include those based on linear prediction or psychoacoustic considerations. It should be appreciated that, in the following examples, a standard frequency analysis is used.

In the following examples, windows, or frames, are 128 samples wide. For audio data signals sampled at 22.05 kHz, this results in a frame width of 5.8 ms and a frame rate of 172 frames per second. However, it should be appreciated that variable window widths and variable window overlaps can also be used.

Each analysis frame is windowed with a 256-point Hamming window. A fast Fourier transform is then used to estimate the spectral components in the window. The logarithm of the magnitude of the of the result is used as an estimate of the power spectrum of the windowed frame. The resulting vector of spectral components characterizes the spectral content of the corresponding window.

This standard audio processing technique is called the spectrogram. The sequence of spectral vectors represents the frequency content of the signal over time. It should be appreciated that some frequency components may be optionally discarded if those frequency components are not useful for determining the similarity and thus the alignment. For example, extremely low or extremely high bands, which often do not have substantial power, may be optionally discarded.

It should be appreciated that, in general, audio data is reference-less. That is, audio data often lacks any directly-discernable internal references which could be used to directly align the watermarked audio signal $x_w(t)$ with the original time-varying audio signal x(t). In audio data, absolute waveform values are often altered during lossy data compression and/or during analog transmission. Thus, it is difficult, if not impossible, to align these signals directly. Additionally, to directly align audio data, a high sampling rate, such as, for example, 40K samples/second, should be used, due to the high rate of change of audio signals.

Accordingly, in various exemplary embodiments, to find the best time-warping function that converts the original time-varying audio signal x(t) into the watermarked audio signal $x_w(t)$, spectrograms for both the original time-varying audio signal x(t) and for the watermarked audio signal $x_w(t)$ are determined and compared. Spectrograms are generally unaffected by lossy data compression and analog tranmission. Additionally, only a relatively low number of spectral coefficients per second, such as, for example, a few hundred spectral coefficients per second, need to be compared to align the spectrograms. If the spectrograms do not align, which would be expected before the original time-varying audio signal x(t) is warped, the original time-varying audio signal x(t) is controllably warped until the spectrograms align.

It should be appreciated that, in various exemplary embodiments, the original time-varying audio signal x(t) is warped using dynamic programming. It should be appreciated that dynamic programming is well documented, such as, for example, in J. Kruskal et al., "An anthology of Algorithms and Concepts for Sequence Comparison," in *Time Warps, String Edits, and Macromolecules: The Theory and Practice of String Comparison*, eds. D. Sankoff et al., CSLI Publications, 1999 and U.S. Pat. No. 4,384,273, each incorporated herein by reference in its entirety. The details of dynamic programming will not be discussed herein. However, it should be appreciated that it can be demonstrated that dynamic programming will find an optimal alignment path in quadratic time.

It should be appreciated that the dynamic programming technique is especially well-suited to recovering the tempo map $T_k$ and is easily usable in the various exemplary embodiments of the systems and methods according to this invention. For example, the dynamic programming technique gracefully handles situations when the original time-varying audio signal x(t) and the watermarked audio signal $x_w(t)$ do not start and end at exactly the same time. Thus, for example, if the watermarked audio signal $x_w(t)$ were extracted from a continuous broadcast, it would not be necessary to exactly specify the start and end points of the continuous broadcast to be extracted as the watermarked audio signal $x_w(t)$. Similarly, the dynamic programming technique gracefully handles situations where the frame spectra do not match exactly. In particular, the dynamic programming technique will successfully identify the tempo map $T_k$ as long as the frame spectra are more similar to each other than they are to their neighbors. As a result, when using dynamic programming techniques, the systems and methods of this invention are robust to reasonable spectral distortion.

It should also be appreciated that, as outlined above, the expected displacements between the compressed or expanded portions of the watermarked audio signal $x_w(t)$ and the corresponding portions of the original time-varying audio signal x(t) are generally quite small. As a result, as shown in FIG. 2, the best time-warping function does not significantly deviate from the diagonal. In this case, the dynamic programming technique can be made to operate in effectively linear time by determining only those time-warping functions that lie very near the diagonal. Similarly, an overall time modification, such as that caused by sampling rate conversion or incorrect analog reproduction speeds, will be gracefully handled by the dynamic programming technique. In this case, the tempo map $T_k$ can be recovered by subtracting the diagonal of the rectangle formed by the cross product of the two signals, rather than the square.

That is, when comparing two signals of the same length, the cross-product is a square. That is, one signal on one axis of the square and the other is plotted on the other, as in FIG. 2. If each signal is the same length, the result will be square. If one signal is longer than the other, the result is a rectangle. The "linear match", with no tempo deviation will be along the diagonal of that rectangle, such as, for example, the diagonal dotted line in FIG. 2.

It should be appreciated that the overall data rate of the tempo function f(t) is a tradeoff between the detectability of the tempo map $T_k$ and the degradation of the watermarked audio signal $x_w(t)$. This can be explained by considering the minimum length for a compression or expansion interval to be a block. For further ease of explanation, the length of all blocks can be set to the same value. In various exemplary embodiments, each block can be compressed or expanded by a factor of $1\pm\epsilon$. If $\epsilon$ is sufficiently small, the compression and expansion can be discretized to an integral multiple of $\epsilon$. That is, each block can be compressed or expanded by a factor of $1\pm n\epsilon$, where n is a small integer. It should also be appreciated that blocks can be left uncompressed, that is, n=0.

To reduce audible artifacts, it is advisable, though it is not strictly necessary, that the magnitude of n be limited to less than some small value n. For the same reason, the change in the value of n should be small between adjacent blocks. To preserve the time length of the file, it is also advisable, in various exemplary embodiments, that n sum to 0 across all blocks in the signal. However, this is not strictly necessary. It should be appreciated that n will sum to 0 when the total amount of compression exactly equals the total amount of expansion. It should also be appreciated that n is allowed to take negative values. Thus, every block b will have an associated code value $n_b$ such that:

$$-N \leqq n_b > N.$$

For a watermarked audio signal $x_w(t)$ having B blocks, the embedded data thus comprises the sequence $n_0, n_1, \ldots, n_B$. It should be appreciated that this sequence can be obtained from the recovered tempo map $T_k$ by quantizing the derivative of the tempo map $T_k$.

The inventors have determined that data can be reasonably embedded into an audio data signal by using a block length of about 0.5 s, a value of $\epsilon$ of approximately 0.01 (1%), and a value for N of 2. Using these values, each second of the audio data signal can encode roughly 2log2 (2N+1) bits. This is slightly more than 8 bits per second. It should be appreciated that this is not an exceptionally large data rate. However, given that a typical popular song is at least approximately 180 seconds long, at a data rate of 8 bits per second, it is possible to encode approximately 180 bytes into that typical popular song. In particular, 180 bytes is generally more than enough data to encode the song title, the artist, the publisher, and an ID number into the audio data of that typical popular song. Moreover, when used as a single watermark, 180 bytes of embedded data would yield more than $10^{400}$ individual identification values. This would generally be more than enough possible values for any conceivable combination of source identifiers, device identifiers and time stamps, for example.

Figure 7:
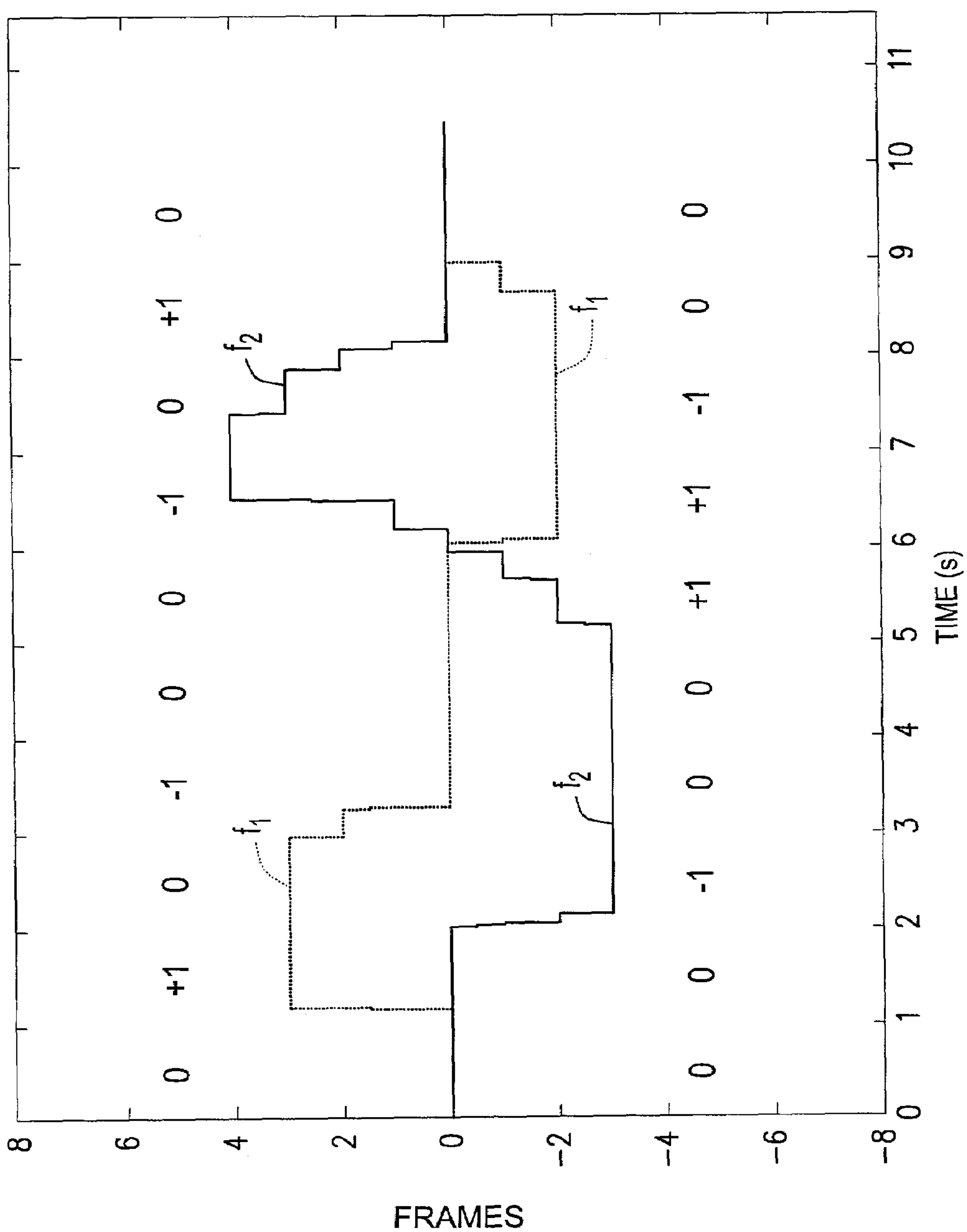
FIG. 7 illustrates one method of encoding binary information into the audio file using time-compressed and time-expanded portions according to this invention.

FIG. 7 shows two exemplary tempo maps $f_1$ and $f_2$. As shown in FIG. 7, time is plotted along the x axis, while the frame offset, i.e., the net offset, between the watermarked audio data signal $x_w(t)$, modified according to these tempo maps, and the original time-varying audio signal x(t) is shown plotted along the x axis. Also shown in FIG. 7 are the binary values encoded by these tempo maps $f_1$ and $f_2$. In particular, this encoding scheme encodes trinary values, with +1 encoded by an increase in the frame offset, a −1 encoded by a decrease in the frame offset and a 0 encoded by a constant frame offset.

In particular, these two tempo maps $f_1$ and $f_2$ were each applied to the same 10-second excerpt of a popular song. The dimensional compression and expansion ratios used to modify this audio signal were 2% over a 1-second region. Accordingly, a total displacement of 20 ms, or 3.44 frames, was obtained. In particular, using the first tempo map $f_1$, blocks of the first copy of the audio signal appearing at 1 and 8 seconds were dimensionally expanded, while blocks appearing at 3 and 6 seconds were dimensionally compressed. In contrast, based on the second tempo map $f_2$, blocks of the second copy of the audio signal appearing at 2 and 7 seconds were dimensionally compressed, while blocks appearing at 5 and 6 seconds were dimensionally expanded.

It should be appreciated that, in FIG. 7, the tempo maps $f_1$ and $f_2$ show the deviation from linear time in spectrogram frames. It should be appreciated that in the tempo maps $f_1$ and $f_2$ shown in FIG. 7, the dimensional compression and dimensional expansion regions are easily detectable, as are the plateaus of time offsets, where blocks of normal tempo that are offset from the corresponding original blocks appear. These plateaus were caused by the various dimensional compression and expansion blocks.

In particular, the time difference between the watermarked audio signal $x_w(t)$ and the original time-varying signal x(t) was determined to within ±1 frame. This suggests that an additional level and/or expansion could be used to effectively double the information capacity embedded into this audio signal. Similar tempo maps were applied to audio signals from other audio domains, such as soundtrack, speech and orchestral music, with similarly good results.

After generating the watermarked audio signals using the tempo maps $f_1$ and $f_2$, the watermarked audio signals were data compressed and then data decompressed using 64 kB MP3 encoding and decoding. The tempo maps $f_1$ and $f_2$, and thus the embedded data, easily survived this lossy encoding and decoding. When these watermarked audio signals were played for a number of test subjects in informal listening tests, the listeners were generally unable to detect the time-based compressions and expansions of the audio signal.

Figure 8:
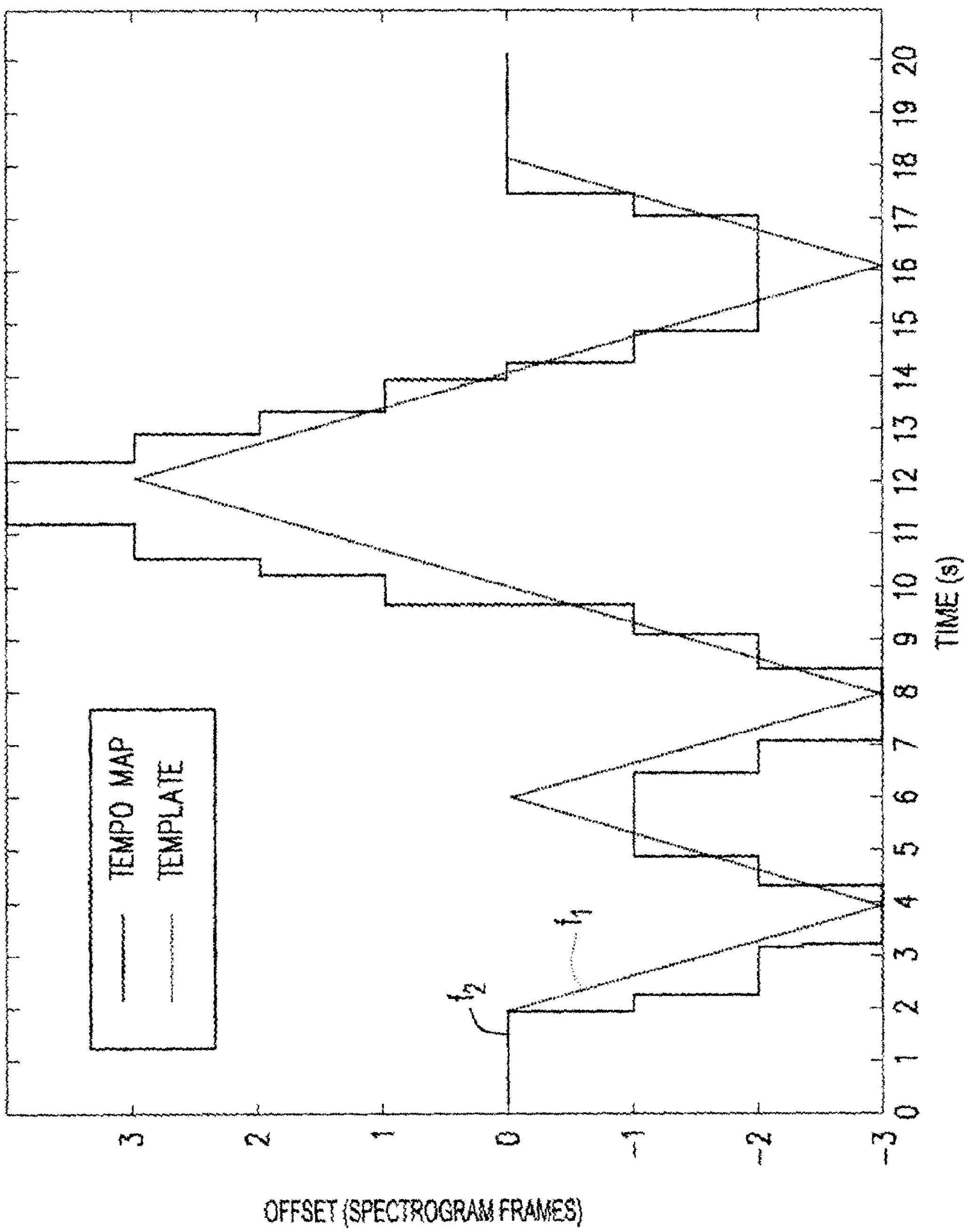
FIG. 8 shows one exemplary embodiment of a recovered tempo map and an expected template usable to embed the binary string "0010" into an audio file according to this invention.

FIG. 8 shows one exemplary result obtained from another experiment that tested the recoverability of watermarks embedded according to this invention. In this experiment, the original time-varying audio signal was a 20-second excerpt from a popular song. This 20-second excerpt was converted to a monophonic representation having a sampling rate of 20,050 Hz. In this experiment, an extremely simple encoding scheme was used to encode a unique 4-bit data string as a watermark into each of 16 different copies of the original time-varying audio signal. That is, each copy received a different 4-bit watermark. In this encoding scheme, one bit of information was encoded using a pair of 2-second blocks. In each pair of 2-second blocks, one of the blocks of the pair was compressed, while the other block was expanded. In particular, a binary "1" was represented by compressing the first block while expanding the second block. In contrast, a binary "0" was represented by expanding the first block while compressing the second block.

In general, each block of the pair was dimensionally expanded or dimensionally compressed by the same percentage as the other block was dimensionally compressed or dimensionally expanded, respectively. Thus, the overall length of each pair of two 2-second blocks remained nominally at 4 seconds.

It should be appreciated that there are more efficient coding schemes which could be used. In particular, a coding scheme that uses a region of no time-scale modification could be used to encode an additional state, generating a trinary coding scheme.

Using the extremely simple coding scheme outlined above, the watermarked audio signal could be generated in real-time from the time-varying original audio signal by concatenating the dimensionally compressed and expanded regions of the original time-varying audio signal. In this case, a dimensionally compressed version of the original time-varying signal and a dimensionally expanded version of the original time-varying signal were each generated using a dimensional compression or expansion ratio of 2.5%. Each version was evenly divided into 10 equal blocks, each 2 seconds long. The watermarked audio signal was created by the simple method of concatenating the dimensionally compressed and dimensionally expanded blocks. The blocks were selected based on the particular 4-bit data to be embedded into that particular copy of the original time-varying audio signal. The blocks at the beginning and end of the watermarked audio signal were not compressed. Thus, only the middle 16 seconds of the watermarked audio signal were altered.

Because the possible sequences of dimensional compression and dimensional expansion are known, i.e., dimensional expansion followed by dimensional compression for a 0, or dimensional compression followed by dimensional expansion for a "1", it is relative straightforward to estimate what the tempo map should be that corresponds to each of the sixteen 4-bit values that could be embedded into the watermarked audio data. For example, given a region of dimensional compression followed by a region of dimensional expansion, the tempo map will speed up then slow again to zero offset, corresponding to a binary "1". In contrast, given a region of dimensional expansion followed by a region of dimensional compression, the tempo map will slow down then speed up again to zero offset, indicating a binary "0". Thus, the tempo maps will have peaks for binary 1's, while the tempo maps will have troughs for the binary 0's.

Accordingly, as shown in FIG. 8, a template, such as the template $f_3$ shown in FIG. 8, can be constructed having linear ramps corresponding to the expected tempo changes. In particular, the template tempo map $f_3$ shown in FIG. 8 corresponds to the 4-bit binary value "0010". FIG. 8 also shows the recovered tempo map $f_3'$, recovered according to the systems and methods outlined above, from a watermarked audio data file embedded with the binary string "0010". As shown in FIG. 8, the recovered tempo map $f_3'$ very closely approximate the template tempo map $f_3$ for this binary string. By comparing each of the templates to the recovered tempo map, it is possible to statistically determine which template a given tempo map corresponds to with fairly high accuracy.

It is then a simple matter of generating similarity scores between each of the templates for each of the possible sequences with the actual tempo map recovered from the dimensionally compressed and expanded data file. For example, a cosine of an angle between a recovered tempo map and a template is a useful metric. Thus, for each of i different templates, a cosine value can be determined between that template and the recovered template map. That is:

$$D_{Ci}(\vec{m}, \vec{t}_i) = (\vec{m} \bullet \vec{t}_i)/|\vec{m}||\vec{t}_i| \qquad (2)$$

where:

$\vec{m}$ is a vector defining the recovered tempo map;

$\vec{t}_i$ is a vector defining the $i^{th}$ template; and $D_{Ci}$ is the cosine of the angle between $\vec{m}$ and $\vec{t}_i$.

This metric is particularly useful because it can generate usable similarity scores regardless of the actual vector magnitudes.

In the experiment outlined above, when using this metric, the template which was a priori know to match the recovered tempo map showed a much higher similarity score than any of the other 15 templates. Sixteen different recovered tempo maps, each corresponding to one of the 16 templates were compared to each of the 16 possible templates, yielding 256 ($16^2$) different tempo map-to-template comparisons. The minimum cosine distance $D_C$ for a comparison between a recovered tempo map and the-corresponding template was 0.910 In contrast, the maximum cosine distance $D_C$ for a comparison between a recovered tempo map and a non-corresponding template was 0.618. Thus, the similarity scores clearly and correctly identified the corresponding templates.

The score differences were proportional to the Hamming distance between the recovered tempo maps and the templates. To increase the score distance, a subset of the templates having larger Hamming distances could be used. For example, the eight four-bit codes with odd parity, that is, an odd number of 1's, could be used. This guarantees a Hamming distance of at least two. In this case, the maximum cosine distance $D_C$ for a comparison between a recovered tempo map and a non-corresponding template was reduced to 0.238.

It should also be appreciated that thresholding, as well as template matching, can be used to covert a recovered tempo map into a string of binary, trinary or other multi-valued function values. For example, the trinary values shown in FIG. 3 show the trinary values that are obtained when using thresholds set to +1 frame and −1 frame.

As outlined above, the systems and methods according to this invention are applicable to data that has a component that varies along a dimension other than time. For example, as outlined above, the systems and methods according to this invention can be applied to data types having spatially-varying data, such as video images, still images and the like. For example, when applied to spatially-varying data, such as video images and still images, by selectively spatially-compressing and spatially-expanding selected portions of the spatially-varying data, the watermarking systems and methods according to this invention are robust under lossy compression and analog reproduction.

When the spatially-varying data is image data, the watermarked encoding can easily be implemented optically as well as digitally, even directly in the mechanism of a printer or photocopier. For example, the watermarked encoding can be introduced into the image data by altering the speed of the scanner or print head, such as by systematically slowing or speeding up the print on the scanner to result in spatially compressed or expanded regions of the scanned or printed image. It should be appreciated that implementing the watermark encoding directly into a printer would be especially valuable in high security applications. That is, a photocopier or printer could encode the time, date, location, device identification, user identification and/or the like invisibly into every copy made or printed. Thus, if an illicit copy is found, the embedded watermark information will help identify when, where, and/or who created that illicit copy.

When applying the systems and methods according to this invention to spatially-varying data, such as image data, areas of the spatially-varying data are dimensionally compressed or dimensionally expanded by an imperceptible amount. Well-known digital resampling techniques can stretch or compress image regions by a small amount. Alternatively, mechanical or optical methods can be used, as outlined above, to stretch or dimensionally compress image regions by a small amount. As outlined above, if the image extends in more than one dimension, two or more axes of warping are available.

It should also be appreciated that it is possible to differentially warp "stripes" across a 2-dimensional image or other set of spatially-varying data. However, it should be appreciated that this may lead to more noticeable artifacts, as straight lines that do not lie parallel to the warp access will no longer be perfectly straight. In particular, for small sets of images, this will lead to visible distortions, particularly for images that have regular lines or grids that run diagonally.

As outlined above for audio data, the image data can be analyzed to find the regions or mode of watermarking that will result in the least perceptible alterations. For example, Fourier analysis of the image can find the angle with the lowest magnitude of the spatial frequencies in that direction. Using this direction as the warping access will minimize perceptible artifacts. Thus, for example, for an image having a plurality of parallel lines, Fourier analysis can easily find direction of the lines. Warping the image parallel to that direction would result in less perceptible artifacts.

Figure 9:
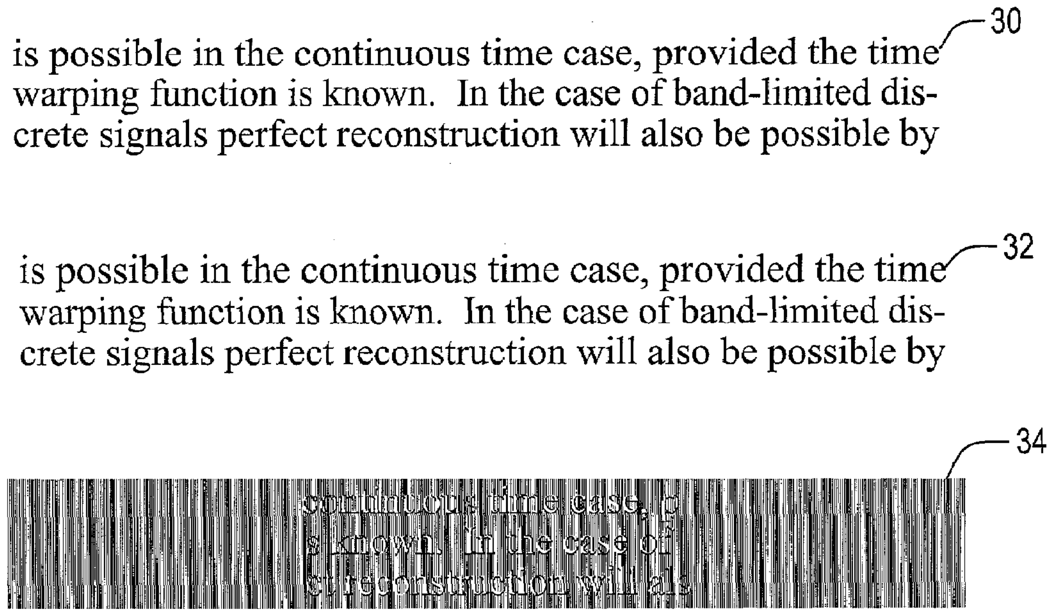
FIG. 9 illustrates how portions of an image can be spatially-expanded and spatially-compressed to embed a watermark into the image according to this invention.

In general, in view of the small degree of warping, watermarking image data according to the systems and methods of this invention will generally not result in perceptible changes for the vast majority of images. In particular, scanned text is especially immune. This occurs because the natural variation due to kerning and line-filling tends to mask the warped regions particularly well. For example, FIG. 9 shows an original image, an image containing embedded data created according to the systems and methods of this invention, and the tempo map used to convert the original image data into the watermarked image data. In particular, without first identifying the watermarked data, it is generally impossible to tell the two examples apart, even when they are closely adjacent.

In particular, in FIG. 9, the text portion 30 is the original image data, while the text portion 32 is the watermarked image data. The tempo map 34 shown in FIG. 9 is recovered using dynamic programming, as outlined above with respect to the audio data. However, unlike time-varying audio data, for which direct comparison can be problematic for the reasons discussed above, the image portions 30 and 32 shown in FIG. 9 can be compared directly. This occurs because the image data contains internal reference points, such as top and bottom edges and side edges, that are generally not affected by lossy data compression and analog transmission, and that can be identified at relatively low sampling rates. Thus, the image portions 30 and 32 can be directly compared to align the image portions 30 and 32.

Columns of pixels perpendicular to the warp axis can be compared by Euclidean or other distance metrics, just as spectral vectors can be compared for audio data. It should be appreciated that the warp direction need not lie parallel to any of the image axes. However, placing the warp direction parallel to one of the image axes tends to simplify recovering the tempo map.

Figure 10:
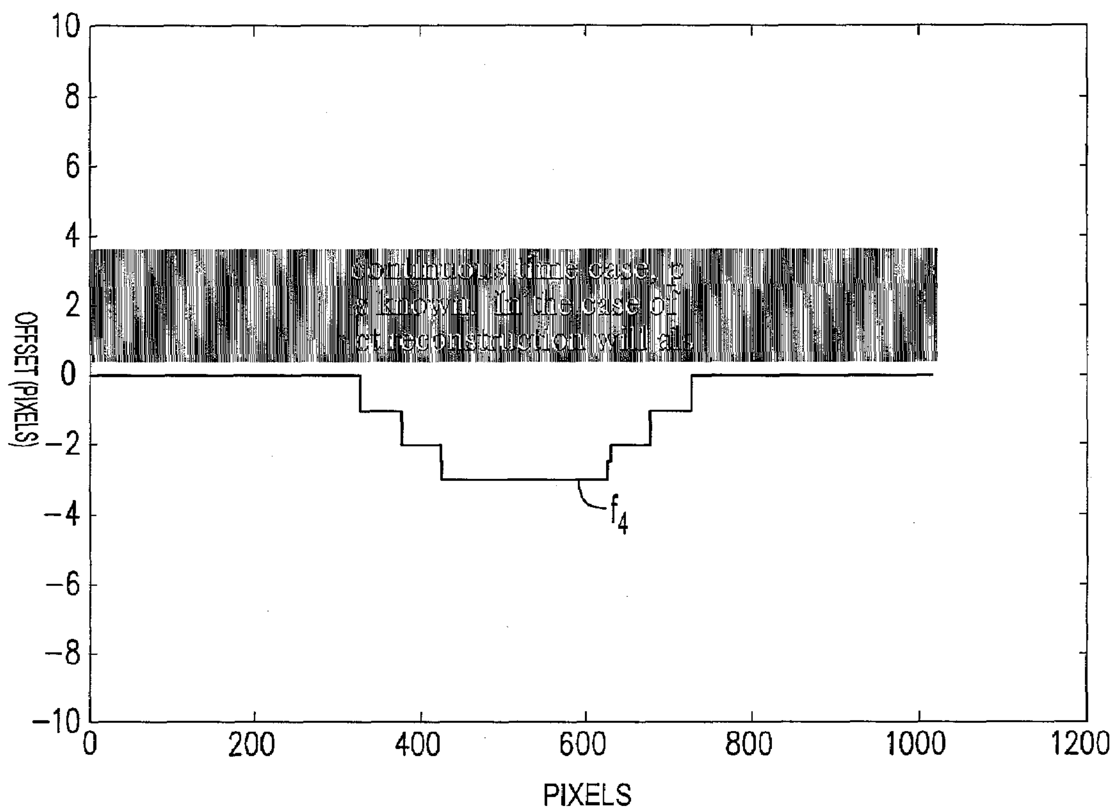
FIG. 10 illustrates the spatial modifications to the image shown in FIG. 4.

In particular, FIG. 10 shows the tempo map $f_4$ obtained by comparing the original image data portion 30 with the watermarked image data portion 32 on a pixel by pixel basis. As shown in FIG. 10, the spatial dimension, in this case pixels, is plotted along the x axis, while the offset, again in pixels, is plotted along the y axis. As shown in FIG. 10, the offset is 0 between 0 pixels and approximately 300 pixels. Then, between 300 and 400 pixels, the offset drops from 0 to approximately −3 pixels. The offset then remains constant from about 400 pixels to about 600 pixels, at which time the offset rises from approximately −3 pixels to 0 pixels between 600 and 800 pixels.

It should be appreciated that the information encoded by this tempo map will depend on the particular encoding scheme used to create this tempo map. However, it should be appreciated that any of the above-outlined encoding schemes discussed previously can be used to create the tempo map $f_4$, or any other tempo map used to spatially compress and expand portions of the original image data to generate the watermarked image data.

FIGS. 11–16 illustrate various exemplary embodiments of the systems and methods according to a second exemplary embodiment of the systems and methods according to this invention. In this second exemplary embodiment of the systems and methods according to this invention, rather than comparing the watermarked data set, whether indirectly, as in the case of audio data, or directly, as in the case of image data, to the original data set, the data set can be modified to eliminate the need for this comparison. That is, the original data set can be analyzed and modified so that the tempo of the data, as it extends along the dimension x of interest, has a predefined temp. In the most simple case, this predefined tempo can be a constant tempo. However, in more complex situations, the tempo of the original data set can itself vary according to a defined function, such as sinusoidal or the like.

One disadvantage of the various exemplary embodiments of the first exemplary embodiment of the systems and methods according to this invention, as well as in the many conventional watermarking techniques, is that the original data is needed to recover the embedded data. It should be appreciated that this is perfectly acceptable for many applications, such as for example, digital rights management, where the owner of the data set would have access to the original data set. However, there are many applications where it would be desirable to be able to extract the embedded data without requiring any reference to the original, unaltered, data set.

For example, time-varying data can be watermarked, and the embedded data extracted, without requiring reference to the original data set if the actual tempo of the time-varying data can be inferred or predicted. For example, methods exist that allow the tempo or the speaking rate of audio data to be analyzed and determined. One such technique is disclosed in J. Foote et al., "The Beat Spectrum: A New Approach to Rhythm Analysis", in *Proc. IEEE International Conference on Multimedia and Expo* (ICME) 2001, HTTP://www.fxpal.com/people/foote/papers/icme2001.htm. Accordingly, it is a generally a simple matter to analyze the time-varying data set to predict the signal rate or tempo at some short time in the future. This information can be used to embed and extract a data set from a time-varying data set using the systems and methods according to this invention without requiring reference to the original data signal.

Thus, in various exemplary embodiments of the second exemplary embodiment of the systems and methods according to this invention, the original data set is analyzed and the tempo of the original data set along the dimension x of interest is altered to match the predicted tempo. If a first-order prediction algorithm is used, the rate-adjusted signal will have a constant tempo. If a higher-order prediction algorithm is used, the rate-adjusted signal will have exactly the tempo prescribed by this higher order prediction. The rate-adjusted signal is then further modified by selectively dimensionally compressing and dimensionally expanding portions of the rate-adjusted signal that extend along the dimension x of interest using the various exemplary embodiments of the systems and methods outlined above with respect to FIGS. 1–10.

To recover the embedded data, only the rate differences between the predicted rate, based on the particular first or higher-order prediction algorithm and the actual rate of the watermarked data set, needs to be identified. This is because the only rate differences that should appear are those occurring due to the selected dimensional expansion and dimensional compression that encodes the embedded data into the watermarked data set. It should be appreciated that the prediction algorithm does not need to be particularly accurate, as long as the prediction algorithm is consistent. However, of course, the more accurate the prediction algorithm is, the better the rate-adjusted signal will match the original signal.

Figure 11:
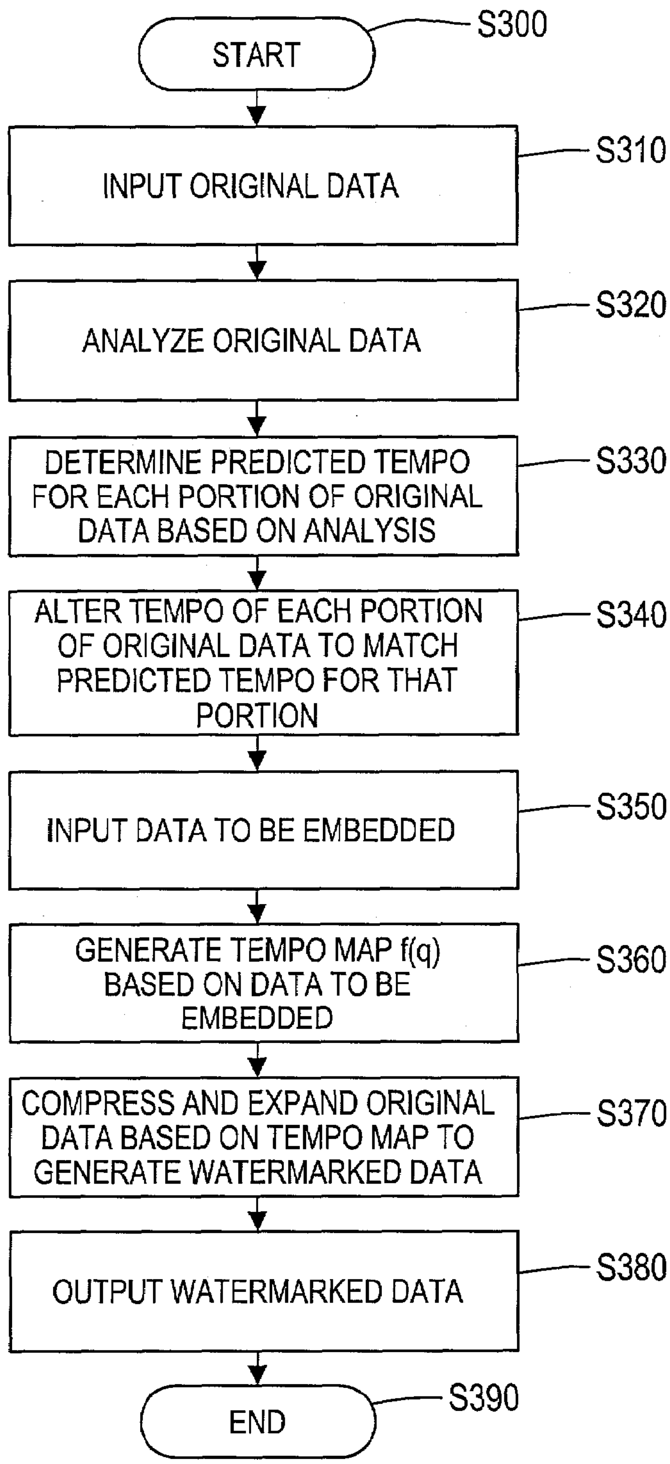
FIG. 11 is a flowchart outlining a second exemplary embodiment of a method for embedding a watermark into a data file.

FIG. 11 is a flowchart outlining a second exemplary embodiment of a method for embedding watermark data into a set of original data according to this invention. As shown in FIG. 11, operation of the method begins in step S300, and continues to step S310, where an original data set is input. Then, in step S320, the original data is analyzed. Next, in step S330, based on the analysis of the original data in step S320, a predicted tempo for each portion of the original data is determined. Operation then continues to step S340.

In step S340, the tempo of each portion of the original data is altered so that the tempo of each portion matches the predicted tempo for that portion determined in step S330. Next, in step S350, a set of data to be embedded into the original data, i.e., the watermark data, is input. Then, in step S360, a tempo map f(q) is generated based on the data to be embedded. Operation then continues to step S370.

In step S370, portions of the original data input in step S310 are selectively dimensionally compressed and dimensionally expanded based on the tempo map f(q) to generate watermarked data in which the data to be embedded input in step S350 has been embedded. Next, in step S380, the watermarked data is output. Then, in step S390, operation of the method ends.

It should be appreciated that, in step S350, the watermarked data can be output in a variety of ways. For example, if the watermarked data is audio data, the watermarked data can be stored onto a digital audio tape or a standard analog cassette tape, broadcast as an AM, FM or satellite radio broadcast, or streamed over a distributed network a via streaming MP3 or Real Audio format. Alternatively, the audio file can be digitized, if it is not already in digital form, and stored on a compact disk, a CD-ROM, a DVD, or any other volatile or nonvolatile digital memory device. Additionally, the watermarked data file can be data compressed using any known or later developed data compression technique appropriate for audio data files and stored on one of the previously discussed memory devices. It should also be appreciated that, whether data compressed or not, the watermarked audio data can be transmitted to a remotely located computer or storage device for storage and/or playback over any known or later playback device or distributed network, such as the Internet, a local area network, a wide area network, a storage area network, an intranet, an extranet, a public switched telephone network and/or a cable television network.

Figure 12:
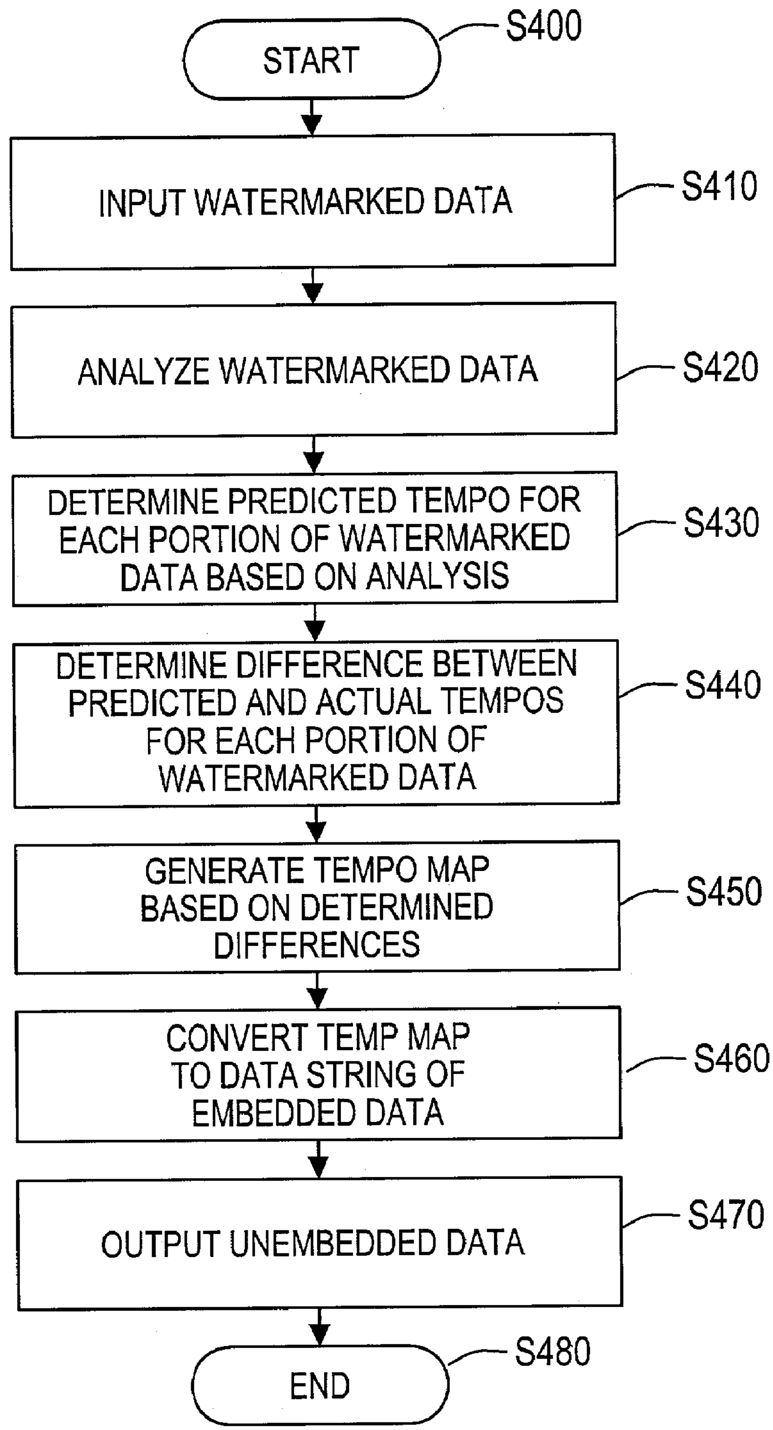
FIG. 12 is a flowchart outlining a second exemplary embodiment of a method for extracting an embedded watermark from a watermarked data file.

FIG. 12 is a flowchart outlining one exemplary embodiment of a method for extracting embedded data from a watermarked data file according to this invention. As shown in FIG. 12, operation of the method begins in step S400, and continues to step S410, where the watermarked data file is input. Then, in step S420, the watermarked data file is analyzed. Next, in step S430, based on the analysis of the watermarked data in step S420, a predicted tempo for each portion of the watermarked data is determined. Operation then continues to step S440.

In step S440, for each portion of the watermarked data, a difference between the predicted tempo for that portion and the actual tempo for that portion is determined. Next, in step S450, based on the determined differences between the predicted tempos for each portion of the watermarked data and the actual tempos for each portion of the watermarked data, a tempo map is generated. Then, in step S460, the tempo map is converted or decoded to obtain the embedded data that was embedded in the watermarked data. Operation then continues to step S470.

In step S470, the embedded data is output to one or more data sinks. Then, in step S480, operation of the method ends.

It should be appreciated that, in step S470, the embedded data extracted from the watermarked data can be output by displaying or printing it. The embedded data can also be output by storing the extracted data, or by transmitting the extracted data over a transmission system, such as those as discussed above with respect to FIG. 3, to transmit the extracted data to a separate site for display storage or further transmission.

Figure 13:
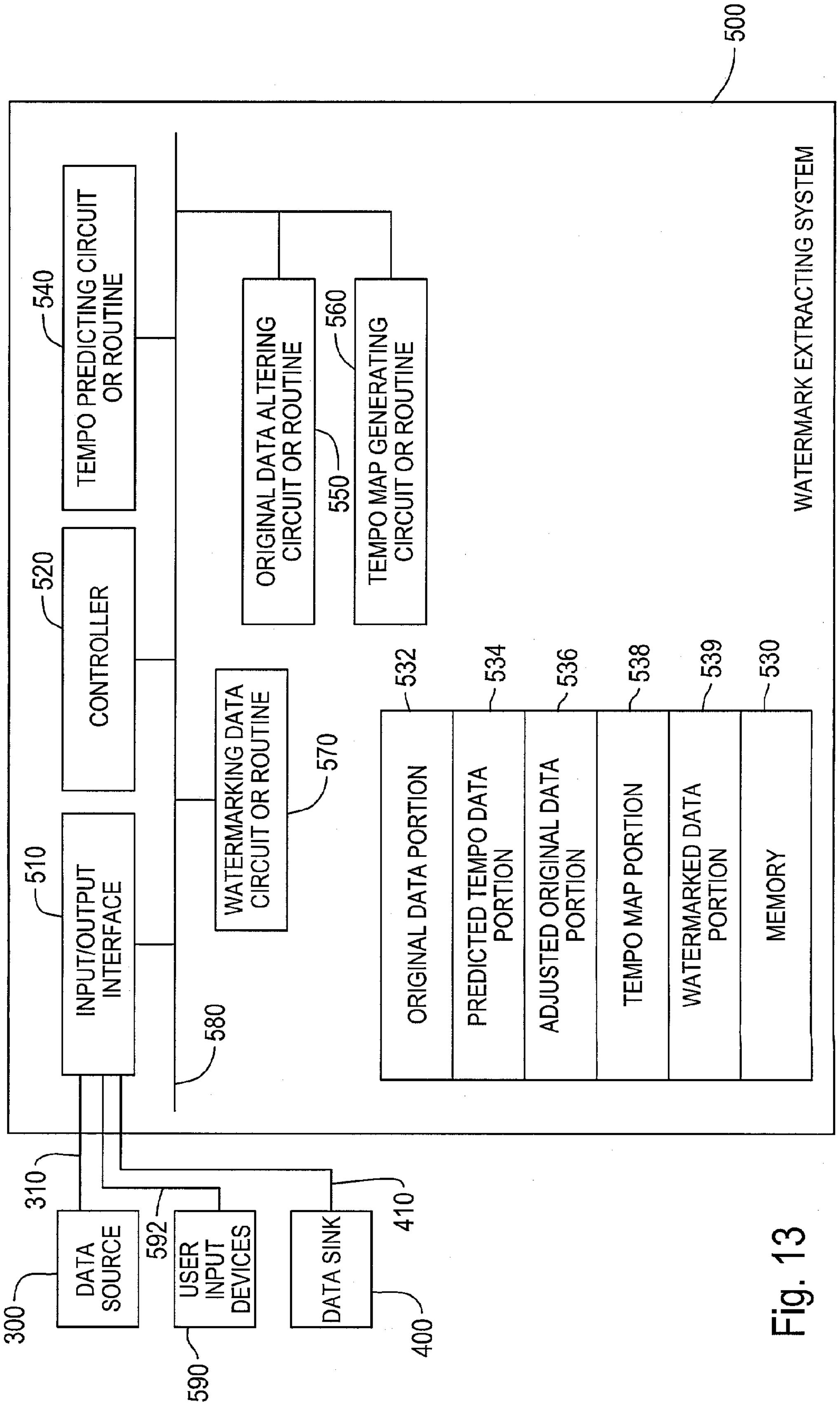
FIG. 13 is a block diagram showing a second exemplary embodiment of a watermark embedding system according to this invention.

FIG. 13 shows one exemplary embodiment of a watermark embedding system 500 according to this invention. As shown in FIG. 13, the watermark embedding system 500 includes an input/output interface 510, a controller 520, a memory 530, a tempo prediction circuit or routine 540, a tempo adjusting circuit or routine 550, a tempo map generating circuit or routine 560, and a watermarked data generating circuit or routine 570, each interconnected by one or more data/control busses or application programming interfaces 580. As further shown in FIG. 13, one or more user input devices 590 are connected over one or more links 592 to the input/output interface. Additionally, the data source 300 is connected over the link 310 to the input output interface 510, as is the data sink 400 over the link 410.

Each of the links 572, 310 and 410 can be implemented using any known or later developed device or system for connecting the one or more user input devices 570, the data source 300 and the data sink 400, respectively, to the watermark embedding system 500, including a direct cable connection, a connection over a wide area network or a local area network, a connection over an intranet, a connection over the Internet, or a connection over any other distributed processing network or system, any of which could include one or more wireless portions. In general, each of the links 572, 310 and 410 can be any known or later developed connection system or structure usable to connect the one or more user input devices 570, the data source 300 and the data sink 400, respectively, to the watermark embedding system 500.

The input/output interface 510 inputs data from the data source 300 and/or the one or more user input devices 590 and outputs data to the data sink 400. The input output interface 510 also outputs data to one or more of the controller 520, the memory 530 and/or the tempo prediction circuit or routine 540 and receives data from one or more of the controller 520, the memory 530 and/or the watermarked data generating circuit or routine 570.

The memory 530 includes one or more of an original data portion 532, an embedded data portion 534, a tempo prediction data portion 536, an adjusted original data portion 537, a tempo map portion 538, and a watermarked data portion 539. The original data portion 532 stores the original data into which the embedded data stored in the embedded data portion 534 will be embedded to form the watermarked data. The embedded data portion 534 stores the embedded data to be embedded into the original data. The predicted tempo data portion 536 stores the predicted tempo for each portion of the original data. The adjusted original data portion 537 stores the tempo-modified original data that has tempos that match the predicted tempos for the portions of the original data. The tempo map portion 538 stores the tempo map generated by the tempo map generating circuit or routine 560. The watermarked data portion 539 stores the watermarked data generated by the watermarked data generating circuit or routine 570. The memory can also store one or more control routines used by the controller 520 to operate the watermark embedding system 500.

The memory 530 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

It should be understood that each of the circuits or routines shown in FIG. 13 can be implemented as portions of a suitably programmed general purpose computer. Alternatively, each of the circuits or routines shown in FIG. 13 can be implemented as physically distinct hardware circuits within an ASIC, or using a FPGA, a PDL, a PLA or a PAL, a digital signal processor or using discrete logic elements or discrete circuit elements. The particular form each of the circuits or routines shown in FIG. 13 will take is a design choice and will be obvious and predicable to those skilled in the art.

In operation, the data source 300 outputs one or both of a set of original data and/or a set of embedded data over the link 310 to the input output interface 590. Similarly, the user input device 590 can be used to input one or more of the set of original data and/or the embedded data, if desired, over the link 592 to the input output interface 510. Depending on which data is input, the input output interface 510 will store the received set of original data in the original data portion 532 and/or the embedded data in the embedded data portion 534. However, it should be appreciated that either or both of these sets of data could have been previously input into the watermark embedding system 510 at some earlier time.

The tempo predicting circuit or routine 540, under control of the controller 520, inputs the original data either from the input/output interface 510 or the original data portion 532. The tempo predicting circuit or routine 540 determines, for each portion of the original data, the predicted or expected tempo of that portion. The tempo predicting circuit or routine 540 outputs, under control of the controller 520, the predicted tempo for each portion of the original data either to the predicted tempo data portion 536 or directly to the tempo adjusting circuit or routine 550.

Then, the tempo map generating circuit or routine 560 under control of the controller 520, inputs the embedded data from the embedded data portion 534 and generates a tempo map that can be used to dimensionally compress and/or dimensionally expand portions of the tempo-adjusted original data to embed the embedded data into the tempo-adjusted original data. It should be appreciated that the tempo map generating circuit or routine 560 can use any known or later-developed encoding scheme, including, but not limited to, those disclosed in this application, to convert the data to be embedded into a tempo map that is usable to modify the original data into the watermarked data. The tempo map generating circuit or routine 560 then outputs the generated tempo map, under control of the controller 520, either to the tempo map portion 538 of the memory or directly to the watermarked data generating circuit or routine 570.

The watermarked data generating circuit or routine 570, under control of the controller 520, inputs the tempo map, from either the tempo map portion 538 or directly from the tempo map generating circuit or routine 560. The watermarked data generating circuit or routine 570, under control of the controller 520, also inputs the tempo-adjusted original data stored in the adjusted original data portion 537. The watermarked data generating circuit or routine 570 then modifies the tempo-adjusted original data by selectively dimensionally compressing and/or dimensionally expanding the tempo-adjusted original data along a defined dimension based on the tempo map to embed the embedded data into the tempo-adjusted original data to form the watermarked data. The watermarked data generating circuit or routine 570 then outputs the watermarked data and, under control of the controller 520, either stores it in the watermarked data portion 539 or provides it directly to the input/output interface 510.

After the watermarked data is generated by the watermarked data generating circuit or routine 550, the watermarked data can be stored indefinitely in the watermarked data portion 539 of the memory 530. At such time as the watermarked data is needed outside of the watermarked embedding system 500, the input/output interface 510, under control of the controller 520, either inputs the watermarked data directly from the watermarked data generating circuit or routine 570 or the watermarked data portion 539 and outputs the watermarked data over the link 410 to the data sink 400.

Figure 14:
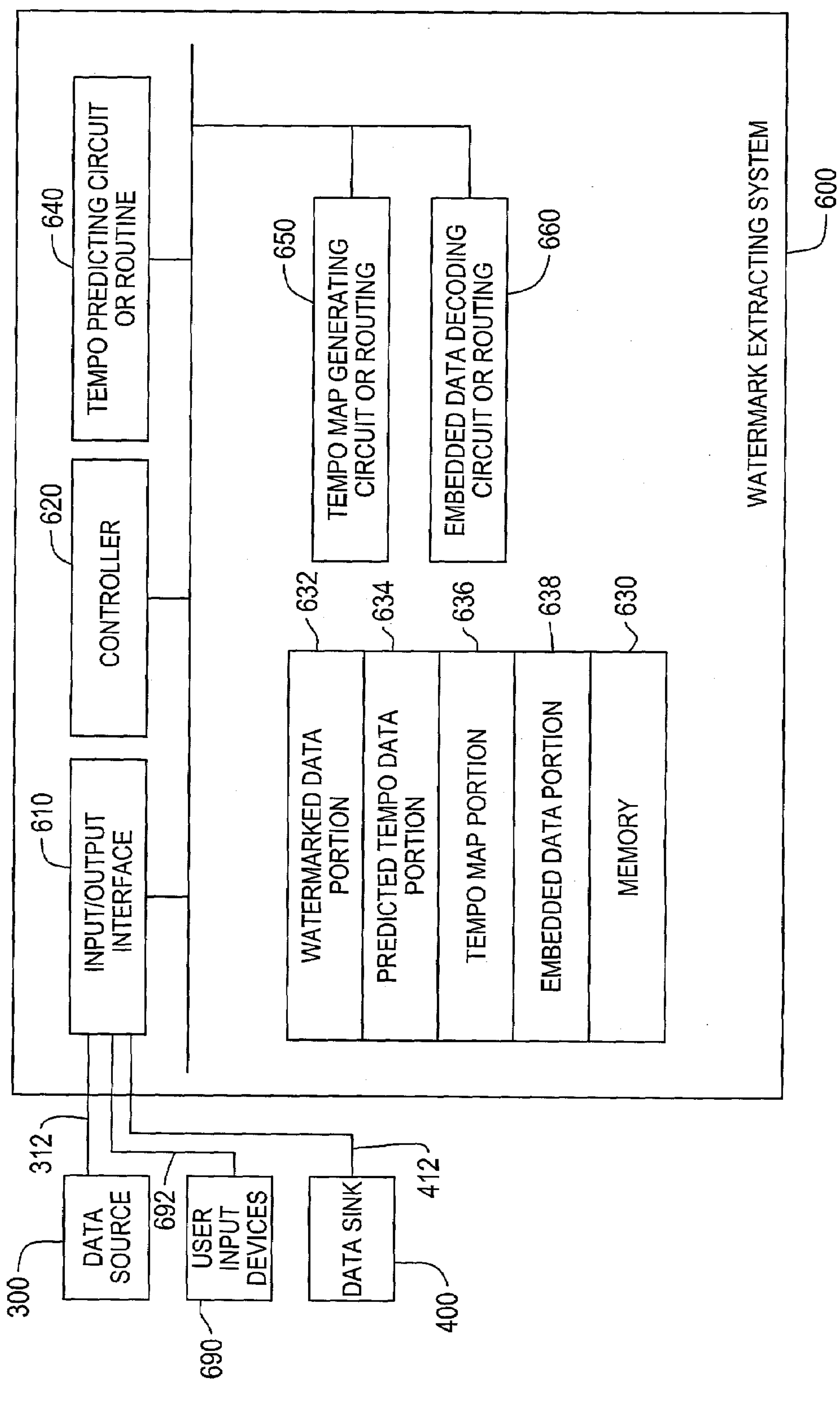
FIG. 14 is a block diagram showing a second exemplary embodiment of a watermark extracting system according to this invention.

FIG. 14 shows one exemplary embodiment of a watermark extracting system 600 according to this invention. As shown in FIG. 14, the watermark extracting system 600 includes and input/output interface 610, a controller 620, a memory 630, a tempo predicting circuit or routine 640, a tempo map generating circuit or routine 650, and an embedded data decoding circuit or routine 660, each interconnected by one or more data/control busses or application interfaces 670.

As shown in FIG. 14, the input/output interface 610 is connected to the data source 300 over the link 312, the data sink 400 over the link 412 and one or more user input devices 690 over one or more links 692. As discussed above, each of the data source 300 and the data sink 400 can take any of the forms outlined above with respect FIG. 5.

Each of the links 692, 312 and 412 can be implemented using any known or later developed device or system for connecting the one or more user input devices 690, the data source 300 and the data sink 400, respectively, to the watermark extracting system 600, including a direct cable connection, a connection over a wide area network or a local area network, a connection over an intranet, a connection over the Internet, or a connection over any other distributed processing network or system, any of which could include one or more wireless portions. In general, each of the links 692, 312 and 412 can be any known or later developed connection system or structure usable to connect the one or more user input devices 690, the data source 300 and the data sink 400, respectively, to the watermark extracting system 600.

The memory 630 includes a watermarked data portion 632, a predicted tempo data portion 634, a tempo map portion 636 and an embedded data portion 638. The memory 630 can also store one or more control programs or routines usable by the controller 620 to control the watermark extracting system 600. The watermarked data portion 632 stores watermarked data containing embedded data. The predicted tempo data portion 634 stores the predicted tempo determined by the tempo predicting circuit or routine 640. The tempo map portion 636 stores the tempo map generated by the tempo map generating circuit or routine 650. The embedded data 638 stores the embedded data decoded by the embedded data decoding circuit or routine 660 from the tempo map stored in the tempo map portion 636.

The memory 630 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

It should be understood that each of the circuits or routines shown in FIG. 14 can be implemented as portions of a suitably programmed general purpose computer. Alternatively, each of the circuits or routines shown in FIG. 14 can be implemented as physically distinct hardware circuits within an ASIC, or using a FPGA, a PDL, a PLA or a PAL, a digital signal processor or using discrete logic elements or discrete circuit elements. The particular form each of the circuits or routines shown in FIG. 14 will take is a design choice and will be obvious and predicable to those skilled in the art.

The data source 300 is usable to output the watermarked data to be stored in the watermarked data portion 632 to the watermark extracting system 600. Likewise, the one or more user input devices 690 are usable to input the watermarked data. The data sink 400 is usable to input the embedded data, extracted by the watermark extracting system 600, from the input output interface 610. In operation, if the watermark extracting system 600 does not already include the watermarked data, the watermark extracting system 600 obtains the missing data from one of the data source 300 or the one or more user input devices 690. If that data is received from the data source 300 or the one or more user input devices 690, that data is input through the input output interface 610 and stored in the watermarked data portion 632.

Next, under control of the controller 620, the watermarked data stored in the watermarked data portion 632 is output to the tempo predicting circuit or routine 640. The tempo predicting circuit or routine 640 predicts the tempo for each portion of the watermarked data. The tempo predicting circuit or routine 640 then, under control of the controller 620, either stores the predicted tempo data into the predicted tempo data portion 634 or provides it directly to the tempo map generating circuit or routine 650.

The tempo map generating circuit or routine 650, based on the predicted tempo, generates a tempo map that indicates which portions of the watermarked data were dimensionally compressed or dimensionally expanded relative to the predicted or expected tempo for that portion of watermarked data. The tempo map generating circuit or routine 650, under control of the controller 620, either stores the tempo map into the tempo map portion 636 or provides it directly to the embedded data decoding circuit or routine 660.

The embedded data decoding circuit or routine 660 inputs, under control of the controller 620, the tempo map from either the tempo map portion 636 or directly from the tempo map generating circuit or routine 650. The embedded data decoding circuit or routine 660 decodes the tempo map based on the original encoding scheme used to generate the tempo map from the embedded data to obtain the embedded data from the tempo map. The embedded data encoding circuit or routine then, under control of the controller 620, provides the decoded embedded data directly to the input output interface 610 for transmission to the data sink 400 or stores it in the embedded data portion 638.

Figure 15:
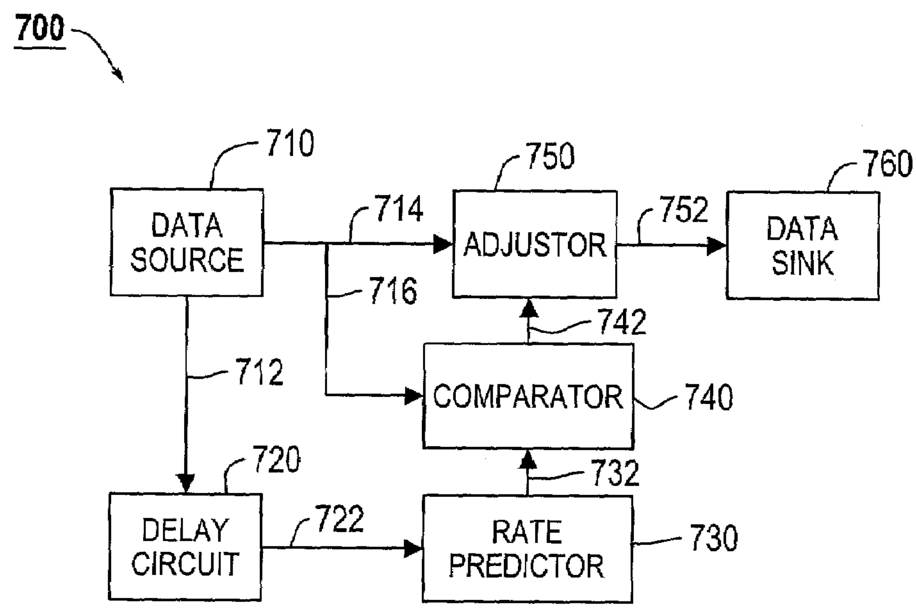
FIG. 15 shows a third exemplary embodiment of a system or device that embeds a watermark into a time-varying data file according to this invention.

FIG. 15 shows a third exemplary embodiment of a watermark embedding system 700 according to this invention. In particular, the third exemplary embodiment of the watermark embedding system 700 shown in FIG. 15 outputs a self-clocking watermarked data file. As shown in FIG. 15, a data source 710 outputs an original data signal over a data signal line or link 712 to a delay circuit 720. The data source 710 also outputs the original data set over a signal line or link 714 to an adjuster 750 and over a signal line or link 716 to a comparator 740. The delay circuit 720 delays the original data signal and outputs the delayed original data signal over the signal line or link 722 to a rate predictor 730.

The rate predictor 730 analyzes the delayed original data signal and outputs a predicted rate over the signal line or link 732 to the comparator 740. The comparator 740 compares the actual tempo of the original data signal received over the signal line or link 716 to the predicted tempo of the data signal recovered from the rate predictor 730. Based on a degree of difference determined by the comparator 740 based on the comparison, the comparator 740 outputs an adjusting signal on the signal line 742 to the adjustor 750.

The adjustor 750 first adjusts the original data signal received on the signal line 714 so that the actual tempo of the original data signal matches the predicted tempo of the original signal, based on the adjustment signal received on the signal line or link 742. The adjustor 750 then further adjusts the tempo of the tempo-adjusted original data signal based on a predetermined tempo map to embed the desired data into the rate-adjusted original data set to generate the self-clocking watermarked data set. The adjustor 750 then outputs the self-clocking watermarked data set over the signal line or link 752 to the data sink 760.

Figure 16:
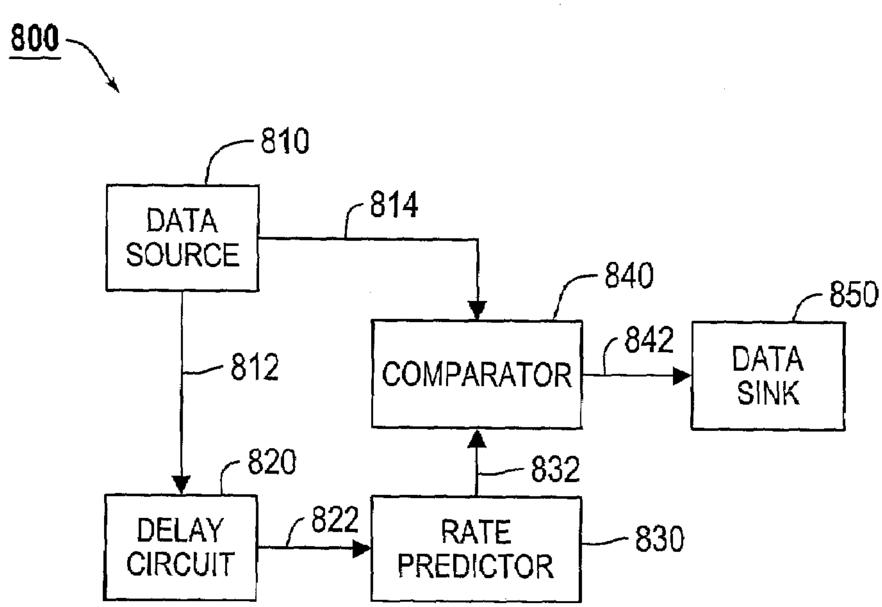
FIG. 16 shows a third exemplary embodiment of a system or device that extracts a watermark from a watermarked time-varying data file according to this invention.

FIG. 16 shows a third exemplary embodiment of a watermark extraction system or device 800 according to this invention. As shown in FIG. 16, the third exemplary embodiment of the watermark extracting device or system 800 includes a data source 810 that outputs a watermarked data signal over a signal line or link 812 to a delay circuit 820. The data source 810 also outputs the self-clocking watermarked data signal over a signal line 814 to a comparator 840. The delay circuit 820 delays the self-clocking watermarked data signal by a predetermined amount and outputs the delayed self-clocking watermarked data signal over the signal line or link 822 to a rate predictor 830. The rate predictor 830 analyzes the delayed self-clocking watermarked data signal and outputs a predicted rate for each portion of the delayed self-clocking watermarked data signal to the comparator 840 over the signal line or link 832.

The comparator 840 compares, for each portion of the watermarked data set, the actual tempo of the self-clocking watermarked data signal received over the signal line or link 814 with the predicted tempo received from the rate predictor 830 over the signal line 532. Based on the comparisons, the comparator 840 generates a tempo map corresponding to the difference between the predicted and actual tempos of the self-clocking watermarked data signal for each portion of the watermarked data set. The comparator 840 then applies the predetermined encoding scheme to convert the tempo map into the string of extracted and decoded embedded data. The comparator 840 then outputs the extracted and decoded embedded data over the signal line or link 842 to the data sink 850.

In the various exemplary embodiments outlines above, the watermark embedding systems 100 and 300, and the watermark extracting systems 200 and 400, can each be implemented using a programmed general purpose computer. However, the watermark embedding systems 100 and 300, and the watermark extracting systems 200 and 400, can each be implemented using a special purpose computer, a programmed microprocessor or microcontroller and peripheral integrated circuit elements, and ASIC or other integrated circuit, a digital signal processor, a hardware electronic or logic circuit, such as a discrete element circuit, a programmable logic device, such as PLD, PLA, FPGA or PAL, or the like. In general, any device, capable of implementing a finite state machine that is in turn capable of implementing one or more of the flowcharts shown in FIGS. 5, 6, 11 and 12, can be used to implement one or more of the watermark embedding systems 100 and 300 and the watermark extracting systems 200 and 400, respectively.

Each of the circuits and element of the various exemplary embodiments of the watermark embedding systems 100 and 300 and the watermark extracting systems 200 and 400 outlined above can be implemented as portions of a suitable programmed general purpose computer. Alternatively, each of the circuits and elements of the various exemplary embodiments of the watermark emphasis system 200 outlined above can be implemented as physically distinct hardware circuits within an ASIC, or using FPGA, a PDL, a PLA or a PAL, or using discrete logic elements or discrete circuit elements. The particular form each of the circuits and elements of the various exemplary embodiments of the watermark embedding systems 100 and 300 and the watermark extracting systems 200 and 400, can each outlined above will take is a design choice and will be obvious and predicable to those skilled in the art.

Moreover, the various exemplary embodiments of the watermark embedding systems 100 and 300 and the watermark extracting systems 200 and 400 outlined above and/or each of the various circuits and elements discussed above can each be implemented as software routines, managers or objects executing on a programmed general purposed computer, a special purpose computer, a microprocessor or the like. In this case, the various exemplary embodiments of the watermark embedding systems 100 and 300 and the watermark extracting systems 200 and 400 and/or each of the various circuits and elements discussed above can each be implemented as one or more routines embedded in the communication network, as a resource residing on a server, as a resource of a printer driver, or the like. The various exemplary embodiments of the watermark embedding systems 100 and 300 and the watermark extracting systems 200 and 400, and the various circuits and routines discussed above can also be implemented by physically incorporating one or more of the watermark embedding systems 100 and 300 and the watermark extracting systems 200 and 400 into a software and/or hardware system, such as the hardware and software system of a web server or a client device.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for embedding a first set of data into a second set of data, the second set of data having at least one dimension along which the data of the second set extends, the method comprising:

dividing the second set of data into a plurality of portions, each of the plurality of portions having an extent along at least a first one of the at least one dimension;

generating a pattern of compression and expansion regions that encode the first set of data; and selectively dimensionally compressing and expanding the extents of at least some of the portions of the second set of data along at least the first dimension according to the pattern of compression and expansion regions to embed the first set of data into the second set of data.

2. The method of claim 1, further comprising, prior to selectively dimensionally compressing and expanding the extends of at least some of the portions of the second set of data:

analyzing the second set of data to determine a predicted tempo for each of the plurality of portions; and modifying, for each of the plurality of portions of the second set of data, an actual tempo for that portion so that the actual tempo for that portion matches the predicted tempo for that portion.

3. The method of claim 2, wherein analyzing the second set of data to determine the predicted tempo for each of the plurality of portions comprises determining the predicted tempo based on a predetermined function for the tempo.

4. The method of claim 3, wherein the predetermined function for the tempo is a constant tempo.

5. The method of claim 3, wherein the predetermined function is at least one of a periodic function and a predictable function.

6. The method of claim 1, wherein the first set of data is a watermark.

7. The method of claim 6, wherein the watermark identifies at least one of a source, a time of creation, a location of creation, an identification value, an identification name, a creator name and an owner name.

8. The method of claim 1, wherein the second set of data is at least one of audio data and video data and the first dimension is time.

9. The method of claim 1, wherein:

the second set of data is at least one of still image data and video data;

the at least one dimension is at least a first spatial dimension;

dividing the second set of data into a plurality of portions comprises dividing the second set of data into a plurality of portions that extend along the first spatial dimension; and selectively dimensionally compressing and expanding the extents of at least some of the portions of the second set of data along at least the first dimension comprises selectively dimensionally compressing and expanding the extents of at least some of the portions of the second set of data along the first spatial dimension.

10. The method of claim 1, wherein:

the second set of data is at least one of still image data and video data;

the at least one dimension comprises a first spatial dimension and a second spatial dimension;

dividing the second set of data into a plurality of portions comprises dividing the second set of data into a plurality of portions that extend along an axis that has components along each of the first spatial dimension and the second spatial dimension; and selectively dimensionally compressing and expanding the extents of at least some of the portions of the second set of data along at least the first dimension comprises selectively dimensionally compressing and expanding the extents of at least some of the portions of the second set of data along the axis.

11. A system that embeds a first set of data into a second set of data, the second set of data having at least one dimension along which the data of the second set extends, the second set of data having a plurality of portions, each of the plurality of portions having an extent along at least a first one of the at least one dimension, the system comprising:

a tempo map generating circuit or routine that generates a pattern of compression and expansion regions that encode the first set of data; and a watermarking circuit or routine that selectively dimensionally compresses and expands the extents of at least some of the portions of the second set of data along at least the first dimension according to the pattern of compression and expansion regions to embed the first set of data into the second set of data.

12. The system of claim 11, further comprising:

a tempo predicting circuit or routine that analyzes the second set of data and that determines a predicted tempo for each of the plurality of portions; and a tempo altering circuit or routine that modifies, for each of the plurality of portions of the second set of data, an actual tempo for that portion so that the actual tempo for that portion matches the predicted tempo for that portion.

13. The system of claim 12, wherein the tempo predicting circuit or routine determines the predicted tempo for each of the plurality of portions based on a predetermined function for the tempo.

14. The system of claim 13, wherein the predetermined function for the tempo is a constant tempo.

15. The system of claim 13, wherein the predetermined function is at least one of a periodic function and a predictable function.

16. The system of claim 11, wherein the first set of data is a watermark.

17. The system of claim 16, wherein the watermark identifies at least one of a source, a time of creation, a location of creation, an identification value, an identification name, a creator name and an owner name.

18. The system of claim 11, wherein the second set of data is at least one of audio data and video data and the first dimension is time.

19. The system of claim 11, wherein:

the second set of data is at least one of still image data and video data;

the at least one dimension is at least a first spatial dimension;

the second set of data is divided into a plurality of portions that extend along the first spatial dimension; and the watermarking circuit or routine selectively dimensionally compresses and expands the extents of at least some of the portions of the second set of data along the first spatial dimension.

20. The system of claim 11, wherein:

the second set of data is at least one of still image data and video data;

the at least one dimension comprises a first spatial dimension and a second spatial dimension;

the second set of data is divided into a plurality of portions that extend along an axis that has components along each of the first spatial dimension and the second spatial dimension; and the watermarking circuit or routine selectively dimensionally compresses and expands the extents of at least some of the portions of the second set of data along the axis.

21. A method for extracting a first set of data from a second set of data into which the first set of data has been embedded, the second set of data having at least one dimension along which the data of the second set extends and having a plurality of portions, each of the plurality of portions having an extent along at least a first one of the at least one dimension, the method comprising:

comparing the second set of data in which the first set of data has been embedded to a reference copy of the second set of data that does not contain the first set of data;

generating a pattern of dimensionally compressed and dimensionally expanded ones of the plurality portions that encodes the first set of data based on the comparison; and converting the pattern of dimensionally compressed and dimensionally expanded ones of the plurality portions into the first set of data.

22. The method of claim 21, wherein comparing the second set of data in which the first set of data has been embedded to the reference copy of the second set of data that does not contain the first set of data comprises:

generating a first set of representational data from the second set of data in which the first set of data has been embedded;

generating a second set of representational data from the second set of data that does not contain the first set of data; and comparing the first set of representational data to the second set of representational data.

23. The method of claim 22, wherein the first and second sets of representational data are first and second spectrograms.

24. The method of claim 21, wherein the first set of data is a watermark.

25. The method of claim 24, wherein the watermark identifies at least one of a source, a time of creation, a location of creation, an identification value, an identification name, a creator name and an owner name.

26. The method of claim 21, wherein the second set of data is at least one of audio data and video data and the first dimension is time.

27. The method of claim 21, wherein:

the second set of data is at least one of still image data and video data; and the at least one dimension is at least a first spatial dimension.

28. The method of claim 21, wherein:

the second set of data is at least one of still image data and video data;

the at least one dimension comprises a first spatial dimension and a second spatial dimension;

the second set of data comprises a plurality of portions that extend along an axis that has components along each of the first spatial dimension and the second spatial dimension; and comparing the second set of data in which the first set of data has been embedded to a reference copy of the second set of data that does not contain the first set of data comprises comparing the second set of data in which the first set of data has been embedded to a reference copy of the second set of data that does not contain the first set of data along the axis.

29. The method of claim 21, wherein converting the pattern of dimensionally compressed and dimensionally expanded ones of the plurality portions into the first set of data comprises comparing at least a portion of the pattern to at least one template.

30. The method of claim 29, wherein the at least one template is at least one predetermined template.

31. The method of claim 29, further comprising estimating the at least one template.

32. The method of claim 21, wherein converting the pattern of dimensionally compressed and dimensionally expanded ones of the plurality portions into the first set of data comprises comparing each portion of the pattern to at least one threshold.

33. The method of claim 32, wherein the at least one threshold is at least one predetermined threshold.

34. The method of claim 32, further comprising estimating the at least one threshold.

35. A method for extracting a first set of data from a second set of data into which the first set of data has been embedded, the second set of data having at least one dimension along which the data of the second set extends and having a plurality of portions, each of the plurality of portions having an extent along at least a first one of the at least one dimension, the method comprising:

determining, for each portion of the second set of data, a predicted tempo for that portion;

determining, for each portion of the second set of data, an actual tempo;

comparing, for each portion, the predicted tempo to the actual tempo for that portion;

generating a pattern of dimensionally compressed and dimensionally expanded ones of the plurality portions that encodes the first set of data based on the comparisons for the plurality of portions; and converting the pattern of dimensionally compressed and dimensionally expanded ones of the plurality portions into the first set of data.

36. The method of claim 35, wherein determining, for each portion of the second set of data, the predicted tempo for that portion comprises analyzing the second set of data to based on a predetermined function.

37. The method of claim 36, wherein the predetermined function is a constant tempo.

38. The method of claim 36, wherein the predetermined function is at least one of a periodic function and a predictable function.

39. A system that extracts a first set of data from a second set of data into which the first set of data has been embedded, the second set of data having at least one dimension along which the data of the second set extends and having a plurality of portions, each of the plurality of portions having an extent along at least a first one of the at least one dimension, the system comprising:

a comparison circuit or routine that compares the second set of data in which the first set of data has been embedded to a reference copy of the second set of data that does not contain the first set of data;

a tempo generating circuit or routine that determines a pattern of dimensionally compressed and dimensionally expanded ones of the plurality portions that encodes the first set of data based on the comparison; and a watermark decoding circuit or routine that converts the pattern of dimensionally compressed and dimensionally expanded ones of the plurality portions into the first set of data.

40. The system of claim 39, wherein the comparison circuit or routine compares the second set of data in which the first set of data has been embedded to the reference copy of the second set of data that does not contain the first set of data by:

generating a first set of representational data from the second set of data in which the first set of data has been embedded;

generating a second set of representational data from the second set of data that does not contain the first set of data; and comparing the first set of representational data to the second set of representational data.

41. The system of claim 40, wherein the first and second sets of representational data are first and second spectrograms.

42. The system of claim 39, wherein the first set of data is a watermark.

43. The system of claim 42, wherein the watermark identifies at least one of a source, a time of creation, a location of creation, an identification value, an identification name, a creator name and an owner name.

44. The system of claim 39, wherein the second set of data is at least one of audio data and video data and the first dimension is time.

45. The system of claim 39, wherein:

the second set of data is at least one of still image data and video data; and the at least one dimension is at least a first spatial dimension.

46. The system of claim 39, wherein:

the second set of data is at least one of still image data and video data;

the at least one dimension comprises a first spatial dimension and a second spatial dimension;

the second set of data comprises a plurality of portions that extend along an axis that has components along each of the first spatial dimension and the second spatial dimension; and the comparison circuit or routine compares the second set of data in which the first set of data has been embedded to a reference copy of the second set of data that does not contain the first set of data along the axis.

47. The system of claim 39, wherein the watermark decoding circuit or routine converts the pattern of dimensionally compressed and dimensionally expanded ones of the plurality portions into the first set of data by comparing at least a portion of the pattern to at least one template.

48. The system of claim 47, wherein the at least one template is at least one predetermined template.

49. The system of claim 47, further comprising estimating the at least one template.

50. The system of claim 39, wherein the watermark decoding circuit or routine converts the pattern of dimensionally compressed and dimensionally expanded ones of the plurality portions into the first set of data by comparing each portion of the pattern to at least one threshold.

51. The system of claim 50, wherein the at least one threshold is at least one predetermined threshold.

52. The system of claim 50, further comprising estimating the at least one threshold.

53. A system for extracting a first set of data from a second set of data into which the first set of data has been embedded, the second set of data having at least one dimension along which the data of the second set extends and having a plurality of portions, each of the plurality of portions having an extent along at least a first one of the at least one dimension, the system comprising:

a tempo predicting circuit or routine that determines, for each portion of the second set of data, a predicted tempo for that portion;

a tempo determining circuit or routine that determines, for each portion of the second set of data, an actual tempo;

a comparison circuit or routine that compares the predicted tempo to the actual tempo for that portion;

a tempo generating circuit or routine that determines a pattern of dimensionally compressed and dimensionally expanded ones of the plurality portions that encodes the first set of data based on the comparisons for the plurality of portions; and a watermark decoding circuit or routine that converts the pattern of dimensionally compressed and dimensionally expanded ones of the plurality portions into the first set of data.

54. The system of claim 53, wherein determining, for each portion of the second set of data, the predicted tempo for that portion comprises analyzing the second set of data to based on a predetermined function.

55. The system of claim 54,wherein the predetermined function is a constant tempo.

56. The system of claim 54,wherein the predetermined function is at least one of a periodic function and a predictable function.

* * * * *